United States Patent [19]

Natan

[11] Patent Number: 5,609,907

[45] Date of Patent: Mar. 11, 1997

[54] SELF-ASSEMBLED METAL COLLOID MONOLAYERS

[75] Inventor: Michael Natan, State College, Pa.

[73] Assignee: The Penn State Research Foundation, University Park, Pa.

[21] Appl. No.: 386,231

[22] Filed: Feb. 9, 1995

[51] Int. Cl.⁶ .............................. B01J 13/00; B05D 3/00
[52] U.S. Cl. ..................... 427/2.12; 427/2.24; 427/299; 427/301; 427/384; 427/399; 427/404; 427/414
[58] Field of Search .................................. 427/2.12, 2.24, 427/301, 414, 299, 399, 404, 229, 384

[56] References Cited

U.S. PATENT DOCUMENTS

| | | | |
|---|---|---|---|
| 4,624,923 | 11/1986 | Margel | 427/222 |
| 4,877,647 | 10/1989 | Kigounde | 427/125 |
| 4,948,739 | 8/1990 | Charmot | 427/213.31 |

OTHER PUBLICATIONS

R. P. Van Duyne, et al., *J. Chem. Phys.*, 99:2101 (1993) (no mo.).
P. A. Schueler, et al., Anal. Chem., 65:3177 (1993) (no mo.).
J. Clarkson, et al., J. Raman Spectrosc., 22:771 (1991)(no mo.).
S. A. Soper, et al., *Anal. Chem.*62:1438 (1990)(no mo.).
D. Fornasiero, et al., *J. Chem. Phys.*87:3213 (1987)(no mo.).
X. K. Zhao, et al., *J. Phys. Chem.*, 92:3350 (1988)(no mo.).
J. A. Creighton, et al., *Chem. Soc. Faraday Trans.* 2, 75:790 (1979)(no mo.).
P. F. Liao, et al., *J. Chem. Phys.*, 76:751 (1982) no mo.
P. F. Liao, et al., *Chem. Phys. Lett.* 82:355 (1981)(no mo.).
R. L. Moody, et al., *Appl. Spectrosc.* 41:966 (1987)(no mo.).

Primary Examiner—Janyce Bell
Attorney, Agent, or Firm—Thomas J. Monahan

[57] ABSTRACT

What follows is a description of an invention for the preparation of macroscopic metal surfaces by self assembly of colloidal metal particles. Metal surfaces play a critical role in technology, and in many cases, the surface morphology dictates function. The strategy delineated herein, the use of nanometer scale colloidal particles to form two-dimensional arrays, allows control of surface morphology to a degree previously unattainable and perhaps even unimaginable.

Specific applications for metallic surfaces with controlled nanostructure include: (i) surface enhanced Raman scattering and all surface spectroscopies based on roughened metal surfaces, including second harmonic generation, surface enhanced hyperRaman scattering, surface plasmon resonance, and surface plasmonpolariton resonance; (ii) biocompatible surfaces, including those that comprise the working elements of electrochemical biosensors, substrates for matrix-assisted laser desorption ionization (MALDI) and biocompatible materials such as implants; (iii) catalysis; (iv) non-linear optical devices, including those based on second or third harmonic generation, the optical Kerr effect, etc.; and (v) electrochemical applications, including those requiring very high surface area/geometric area ratios, arrays of closely or variably spaced microelectrode arrays, and surfaces with exceptional biocompatibility and facile electron transfer properties.

15 Claims, 34 Drawing Sheets

Scheme I

Scheme II

= streptavidin  = biotin  = BSA

Scheme III

200nm

50nm

—20nm

—200nm

—200nm

SELF-ASSEMBLED METAL COLLOID MONOLAYERS

BACKGROUND OF THE INVENTION

The present invention relates to self-assembled metal colloid monolayers, methods of preparation, and use thereof.

In surface enhanced Raman scattering (SERS), million-fold enhancements in Raman scattering can be obtained for molecules adsorbed at suitably rough surfaces of Au, Ag, and Cu. Although many approaches have been reported, preparation of well-defined, stable SERS substrates having uniform roughness on the critical 3 to 100 nm scale has proven difficult. Because colloidal Au can be synthesized as monodisperse solutions throughout most of this size regime, and because molecules adsorbed to closely spaced colloidal Au and Ag exhibit enhanced Raman scattering, these particles are excellent building blocks for SERS-active substrates. The key issue is whether colloidal Au and Ag particles can be organized into macroscopic surfaces that have a well-defined and uniform nanometer-scale architecture. Indeed, controlling nanostructure is currently a central focus throughout materials research. Progress in self assembly of organic thin films on metal surfaces [C. D. Bain and G. M. Whitesides, Angew. Chem. Int. Ed. Engl. 28, 506 (1989); A. Ulman, An Introduction to Ultrathin Organic Films, from Langmuir-Blodgett to Self-Assembly (Academic Press, Boston, 1991)] led us to explore the reverse process: self assembly of colloidal Au and Ag particles onto supported organic films. As detailed below, this approach has yielded surfaces that are SERS-active, characterizable at both the macroscopic and microscopic levels, highly reproducible, electrochemically addressable, and simple to prepare in large numbers. Moreover, these substrates have a surface roughness that is defined by the colloid diameter (which is tunable) and an average interparticle spacing that is continuously variable. As such, self-assembled Au and Ag colloid monolayers are likely to have extraordinary utility for SERS.

In the nearly twenty years since the discovery of surface enhanced Raman scattering (SERS) of molecules adsorbed at roughened Ag electrodes, and the accompanying theoretical work demonstrating the need for surface roughness, there have been numerous reports of new architectures for SERS substrates. See, for instance, Liao, P. F.; Bergman, J. G.; Chemla, D. S.; Wokaun, A.; Melngailis, J.; Hawyduk, A. M.; Economou, N. P. Chem. Phys. Lett. 1981, 82, 355–9; Creighton, J. A.; Blatchford, C. G.; Albrecht, M. G. J. Chem. Soc., Faraday Trans. 2 1979, 75, 790 8; Blatchford, C. G.; Campbell, J. R.; Creighton, J. A. Surf. Sci. 1982, 120, 435–55; Tran, C. D. Anal. Chem. 1984, 56, 824–6; Soper, S. A.; Ratzlaff, K. L.; Kuwana, T. Anal. Chem. 1990, 62, 1438–44; Sequaris, J.-M.; Koglin, E. Fresenius J. Anal. Chem. 1985, 321, 758–9; Aroca, R.; Jennings, C.; Kovacs, G. J.; Loutfy, R. O.; Vincett, P. S. J. Phys. Chem. 1985, 89, 4051–4; Moody, R. L.; Vo-Dinh, T.; Fletcher, W. H. Appl. Spectrosc. 1987 41, 966–70; Ni, F.; Cotton, T. M. Anal. Chem. 1986, 58, 3159–63; Yogev, D.; Efrima, S. J. Phys. Chem. 1988, 92, 5761–5; Goudonnet, J. P.; Bijeon, J. L.; Warmack, R. J.; Ferrell, T. L. Phys. Rev. B: Condensed Matter 1991, 43, 4605–12; Murray, C. A.; Allara, D. L. J. Chem. Phys. 1982, 76, 1290–1303; Brandt, E. S. Appl. Spectrosc. 1993, 47, 85–93; Alsmeyer, Y. W.; McCreery, R. L. Anal. Chem. 1991, 63, 1289–95; Mullen, K.; Carron, K. Anal. Chem. 1994, 66, 478–83; Beer, K. D.; Tanner, W.; Garrell, R. L. J. Electroanal. Chem. 1989, 258, 313–25; Dawson, P.; Alexander, K. B.; Thompson, J. R.; Haas III, J. W.; Ferrell, T. L. Phys. Rev. B: Condens. Matter 1991, 44, 6372–81; Roark, S. E.; Rowlen, K. L. Appl. Spectrosc. 1992, 46, 1759–61; Roark, Shane E.; Rowlen, K. L. Chem. Phys. Lett. 1993, 212, 50; Roark, Shane E.; Rowlen, K. L. Anal. Chem. 1994, 66, 261–70; Walls, D.; Bohn, P. J. Phys. Chem. 1989, 93, 2976–82; Dutta, P. K.; Robins, D. Langmuir 1991, 7, 2004–6; Sheng, R.-S.; Zhu, L.; Morris, M.D. Anal. Chem. 1986, 58, 1116–9.

These surfaces span a wide range of assembly principles and encompass similarly broad levels of complexity. Examples of SERS-active surfaces include electrochemically-roughened electrodes, microlithographically-prepared elliptical Ag posts, aggregates of colloidal Au or Ag particles—both in solution and associated with chromatographic media, evaporated thin films, Ag-coated latex particles, substrates prepared by chemical reduction of $Ag^+$, and liquid Ag films. The motivation for this work stems from several intrinsically attractive aspects of SERS as a vibrational spectroscopy-based structural tool and/or analytical method: million fold signal enhancements compared to solution Raman spectra, adsorption-induced fluorescence quenching, a lack of interference from $H_2O$, and molecular generality. However, while SERS has been invaluable for certain narrowly defined applications, most spectroscopists would agree that the technique has not lived up to its enormous potential.

The problem has been the inability of any previous surface to meet all, or even most, of the essential criteria that would define a truly useful SERS substrate: strongly enhancing, reproducible, uniformly rough, easy to fabricate, and stable over time. Biocompatibility is also extremely important, insofar as previous studies demonstrating partial or full protein denaturation upon adsorption to SERS-active substrates [Holt, R. E.; Cotton, T. M. J. Am. Chem. Soc. 1989, 111, 2815–21; Lee, N.-S.; Hsieh, Y.-Z.; Morris, M. D.; Schopfer, L. M. J. Am. Chem. Soc. 1987, 109, 1353–63] have proven to be a major setback to the use of SERS in biological systems. Other desirable characteristics include electromagnetic tunability (i.e. the ability to control the wavelength where optimal enhancement occurs, so as to match the substrate to the photon source), electrochemical addressability—to control the extent of adsorption and the redox state of adsorbed species, a lack of surface "activation" steps, and a low cost per substrate.

SUMMARY OF THE INVENTION

Detailed embodiments of the present invention are disclosed herein. However, it is understood that certain preferred embodiments are merely illustrative of the invention which may be embodied in various forms and applications. Specific compositional and functional details disclosed herein are not meant to be interpreted as limiting, but merely as support for the invention as claimed and as appropriate representations for teaching those skilled in the art to variously employ the present invention in any appropriate embodiment.

We report here a new approach to SERS substrates that meets all of the criteria delineated above. Our strategy involves assembly of colloidal Au, Ag. or other suitable metal particles into macroscopic two-dimensional arrays on polymer-immobilized substrates (FIG. 1). In the first, covalent approach, reactive hydroxyl/oxide groups are generated on a substrate. For many substrates (glass, metal, etc.), such functional groups are already present in high concentration.

A second step involves surface-initiated polymerization of bifunctional organosilanes such as $(RO)_3Si(CH_2)_3A$. The alkoxysilane forms covalent attachments to the surface via hydrolysis. The pendant functional group A (FIG. 1B), chosen for its high affinity toward noble metal surfaces, extends out into solution. In the final step, the polymer-derivatized substrate is immersed into a solution of colloidal Au particles, where surface assembly spontaneously occurs. An alternate approach based on high affinity binding of streptavidin to biotin can also be used (FIG. 1C). See Wilchek, M.; Bayer, E. A. *Anal. Blochem.* 1988, 171, 1 and Anzai, J.; Hoshi, T.; Osa, T *Trends Anal. Chem.* 1994, 13, 205–10. Here, a biotinylated surface is reacted with a colloidal Au-streptavidin conjugate to form a colloid-based surface held together by non-covalent interactions.

With molecular self-assembly on metal substrates [Nuzzo, R. G.; Allara, D. L. *J. Am. Chem. Soc.* 1983, 105, 4481–4483; Bain, C. D.; Whitesides, G. M. *Angew. Chem. Int. Ed. Engl.* 1989, 28, 506–512] now established as an important route to controlling interfacial properties, it should be pointed out that the approaches delineated in FIG. 1 define what is essentially the inverse process: self-assembly of well-defined particulate metal films on organic substrates. The term self-assembly refers to our finding that interparticle spacing is governed by interparticle repulsive forces. We have explored this chemistry in detail by varying substrate, polymer, colloid diameter, and reaction conditions. Moreover, the electrochemical characteristics of colloid-based surfaces, the kinetics of surface formation, and the electromagnetic properties of composite particles have been investigated. We also describe here the basic steps involved in surface assembly and characterization, as well as experimental verification of SERS activity. What distinguishes this work are the following features: macroscopic surfaces of controlled and uniform roughness can be prepared by self-assembly, the resulting substrates are compatible with biomolecules, and the surfaces exhibit a high degree of durability/stability over time.

Our construction protocol for SERS-active Au and Ag colloid monolayers exploits the simplicity of self assembly from solution and the affinity of noble metal surfaces for certain organic functional groups (FIG. 1). In our case, these moieties are present by virtue of organic films either polymerized or deposited on the surface of macroscopic (0.8 cm×2 cm) substrates. Immersion of the functionalized substrate into a dilute solution of monodisperse colloidal Au or Ag particles leads to colloid immobilization. This solution-based process is extremely general, encompassing numerous permutations of insulating and conducting substrates [glass, quartz, plasma-treated Teflon, Formvar, indium-doped $SnO_2$ (ITO), and Pt], organic films [hydrolyzed mono-, di- and trialkoxysilanes containing the functional groups CN, $NH_2$, 2-pyridyl, $P(C_6H_5)_2$, and SH, as well as carboxyl-terminated $C_{18}$ organothiol self-assembled monolayers], and colloids [5 to 70 nm in diameter for Au, and 5 to 20 nm in diameter for Ag and Au/Ag composites]. Our work has focused on Au and Ag particles, but with the right functional group A, a wide variety of colloidal particles could constitute building blocks for well-defined macroscopic surfaces.

Solution-based surface assembly also eliminates preparative, geometric, and operational constraints associated with most previously described SERS substrates. Thus, one liter of 17 nM, 12-nm diameter colloidal Au, which can be stored indefintely at room temperature, can be used to prepare 2,000 0.5-cm$^2$ surfaces with only a 1% decrease in colloid concentration. Importantly, these substrates can be assembled sequentially or simultaneously. Surfaces in novel geometries that extend the utility of SERS can now be derivatized, including one face of a 5 ml-volume spectroelectrochemical cell, large glass sheets several centimeters on a side, and the inside of a 20-mm inner diameter glass capillary. Moreover, once constructed, no further activation steps (such as electrochemical oxidation-reduction cycles or particle aggregation) are required to initiate SERS activity. It should be noted that the particles are tightly bound and the thermodynamic stability of these surfaces is very high: exchange with molecules in solution containing the functional group A does not occur.

This preparation method differs greatly from electrochemical toughening of electrodes and metal vapor deposition, the most common routes to solid SERS substrates. Each of these protocols yields surfaces with polydisperse roughness on the nanometer scale. This problem is circumvented by the methods of FIG. 1. Since the size of the colloid precursor can be easily varied and controlled, the defining roughness of the surface is pre-determined. Not only can the roughness be tuned according to experimental needs, but the roughness is uniform—all particles are of the same size and dimensions. This is of particular importance in SERS where enhancement at the surface is directly correlated to nanometer scale roughness.

Two-dimensional colloid self assembly also differs from the numerous methods for preparation of SERS-active substrates involving colloidal particles [Creighton, J. A.; Blatchford, C. G.; Albrecht, M. G. *J. Chem. Soc., Faraday Trans.* 2 1979, 75 790–8; Blatchford, C. G.; Campbell, J. R.; Creighton, J. A. *Surf. Sci.* 1982, 120, 435–55; Tran, C. D. *Anal. Chem.* 1984, 56, 824–6; Soper, S. A.; Ratzlaff, K. L.; Kuwana, T. *Anal. Chem.* 1990, 62, 1438–44; Sequaris, J. M.; Koglin, E. *Fresenius J. Anal. Chem.* 1985 321, 758–9; Ahem, A. M.; Garrell, R. L. *Langmuir* 1991, 7, 254–6; Angel, S. M.; Katz, L. F.; Archibald, D. D.; Honigs, D. E. *Appl. Spectrosc.* 1989, 43, 367–72; Clarkson, J Campbell, C.; Rospendowski, B. N.; Smith, W. E. *J. Raman Spectrosc.* 1991, 22, 771–775]. In those methods, there is a single size of particle, but since there is no control over interparticle interactions, aggregates of ill-defined dimensions are often formed. this world, strong covalent or non-covalent bonds to the substrate reduce the surface mobility of the nanoparticles and prevent the spontaneous coalescence of particles on the surface. Thus, the initial size uniformity is maintained.

For several reasons, keeping the particles physically separated is a critical component to our assembly strategy. (1) The intrinsic biocompatibility of individual colloidal Au particles is maximized: aggregates begin to approximate larger surfaces where, for Au, protein denaturation is a serious concern (2) The resulting surfaces are more straightforwardly characterized than particle aggregates. (3) It is known both from theory and experiment that closely-spaced but physically separated particle arrays can be strongly enhancing [Inoue, M.; Ohtaka, K. *J. Phys. Soc. Jpn.* 1983, 52, 3853–64; Chu, L.-C.; Wang, S.-Y. *J. Appl. Phys.* 1985, 57, 453–9; Chu, L.-C.; Wang, S.-Y. *Phys. Rev. B: Condens. Matter* 1985, 31, 693–9]. As the interparticle spacing increases toward nearly all of the SERS effect is lost: completely isolated colloidal Au particles are very weakly enhancing. In our view, the relatively small loss in enhancement for non-contacting, closely-spaced particles is more than offset by an increased ease of characterization, improved biocompatibility, and demonstrated improvements in stability (vide infia). FIG. 1D depicts various regimes for colloid iramobilization that could result from using the strategy delineated above. In surface A, the particles are isolated, but too far apart to be strongly enhancing. In B, the particles are close enough to see the SERS effect, but still isolated (thus retaining the biocompatibility properties of individual particles). Surface C represents a close-packed colloid monolayer, while D represents immobilized aggregates approximating a bulk surface. Our goals are to prepare and characterize surfaces like B, and to use them to solve problems in bioanalytical and bioinorganic chemistry.

To this end, the ease of fabrication and handling of Au colloid monolayers is very significant. Large numbers of samples can be prepared simultaneously, with no restrictions on the size or shape of the substrates, and without the need for even moderately sophisticated equipment (i.e. no potentiostat, no vacuum deposition apparatus). Furthermore, with transparent substrates, the optical properties of the SERS-active surface can be monitored directly. This means that a reasonably accurate prediction of enhancement factors can be made a priori. Indeed, as described below, uv-vis is our basic characterization tool.

DETAILED DESCRIPTION OF THE INVENTION

Below we describe data regarding the preparation, characterization, and applications of self-metal colloid monolayers. Experimental examples are included.

Two lines of evidence demonstrate that immobilized particles are located solely at the surface of, and not embedded within, the organic film. (i) Colloidal particles are very tightly attached to the polymer (when stored in water, no particle dissociation occurs after 1 year), yet monolayer formation does not occur on polymers with pendant methyl or methoxy groups. These data indicate that multiple specific covalent interactions between polymer functional groups (which are oriented toward the solution) and the particle surface are necessary for immobilization. (ii) Although SERS spectra for adsorbates from solution are easily obtained (see below), the SERS spectra of organosilane polymer films underneath Au monolayers are quite weak. This contrasts with published SERS studies of colloid/ polymer mixtures [P. Matejka, B. Vlckova, J. Vohlidal, P. Pancoska, V. Baumruk, *J. Phys. Chem.* 96, 1361 (1992); P. C. Lee and D. Meisel, *Chem. Phys. Lett.* 99, 262 (1983)], and demonstrates that the surface of immobilized metal particles is accessible to solvent. In accord with this finding is our observation that the optical spectrum of Au colloid monolayers on transparent substrates depends on the dielectric constam of the surrounding medium.

The optical properties of colloidal Au and the nature of self assembly offer an unprecedented opportunity to monitor surface evolution in real time. The time course of Au colloid monolayer formation on a glass slide coated with polymerized 3-aminopropyltrimethoxysilane (APTMS) is shown in FIG. 2. Binding of 12-nm diameter Au particles to amine groups on the surface is indicated by an absorbance feature at 520 nm, the location of the Mie resonance for isolated small Au particles. As the particle coverage increases, interparticle spacing becomes small compared to the incident wavelength, and a new feature corresponding to a collective particle surface plasmon oscillation grows in at ~650 nm. This feature is responsible for the pronounced SERS activity of collections of colloidal Au particles. Accordingly, when a colloid monolayer in various stages of formation is placed in a solution containing the adsorbate trans-1,2-bis (4-pyridyl-)ethylene (BPE), the SERS intensity for the ring stretch at $1610$ cm$^{-1}$ closely tracks the magnitude of the absorbance at 650 nm. Immersion time is one of four routes we have found to alter the rate or extent of surface formation, the others being choice of organosilane functional group (rate of surface formation for SH>NH$_2$>> CN), colloid concentration, and the presence or absence of an adsorbate on the colloidal particle.

Figure 1A:
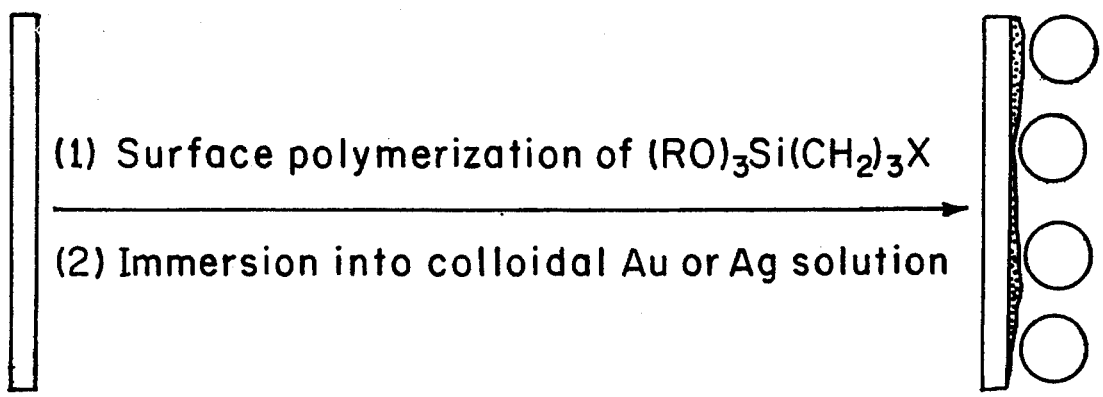
FIGS. 1A and 1B show assembly strategies for Au and Ag colloid monolayers; X=A=CN, $NH_2$, 2-pyridyl, $P(C_6H_5)_2$, and SH.
Figure 1B:
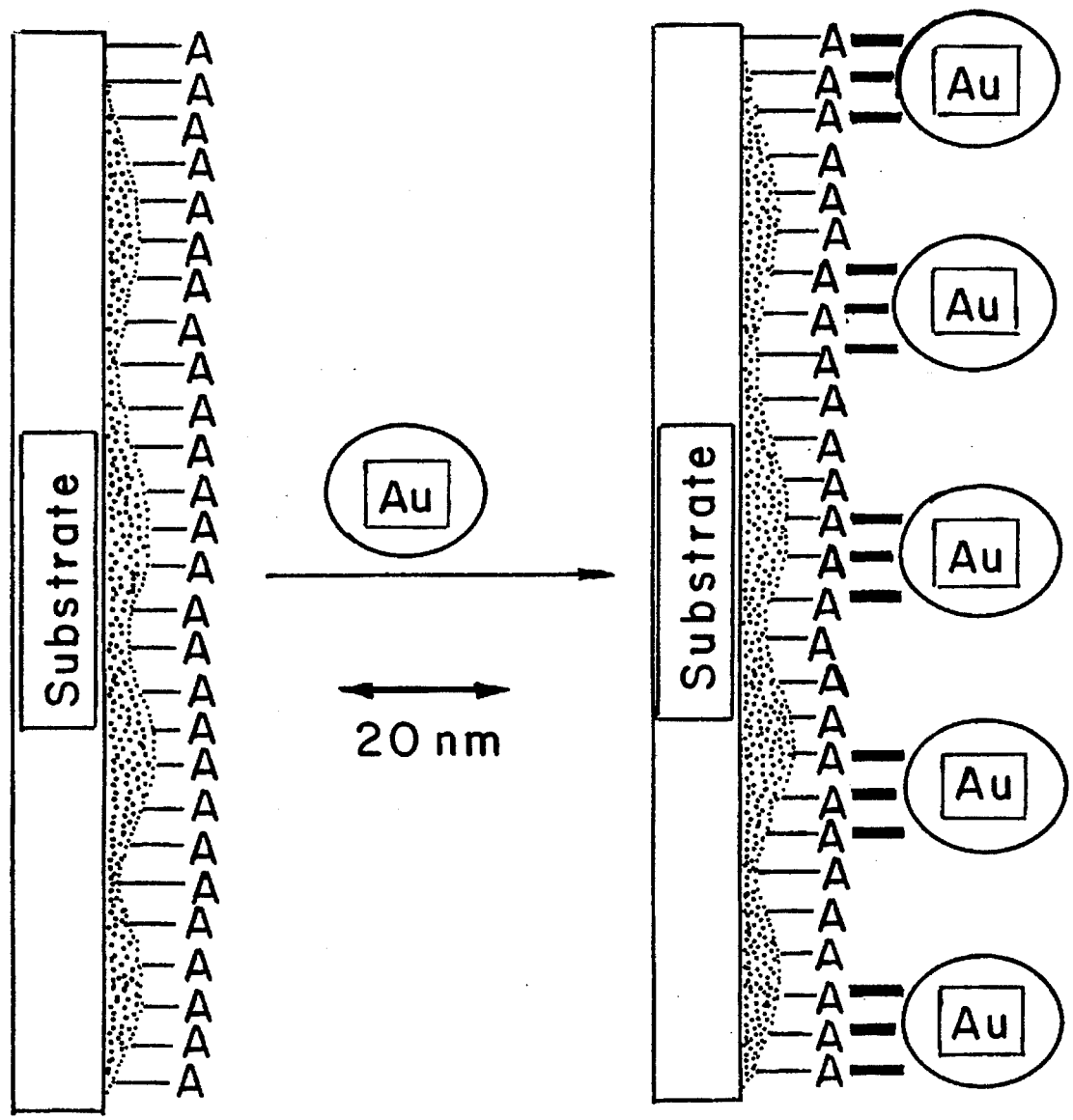
Figure 1C:
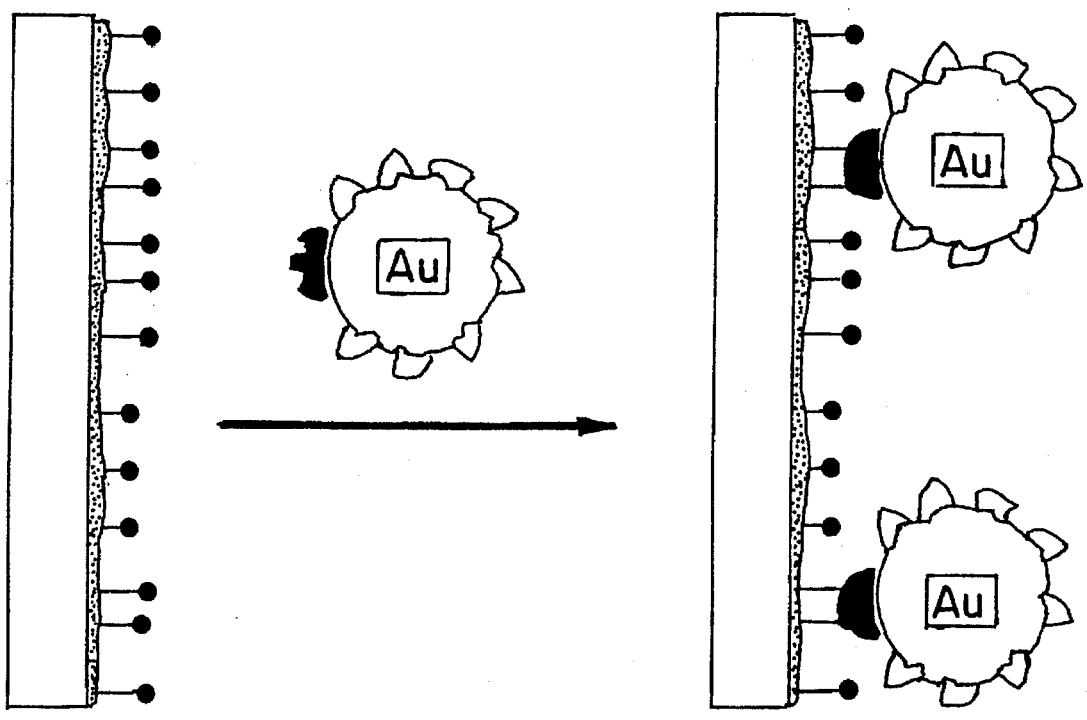
FIG. 1C demonstrates one embodiment of the present invention based on high affinity binding of streptavidin to a biotin.
Figure 1C:
Figure 1C:
Figure 1C:
Figure 1D:
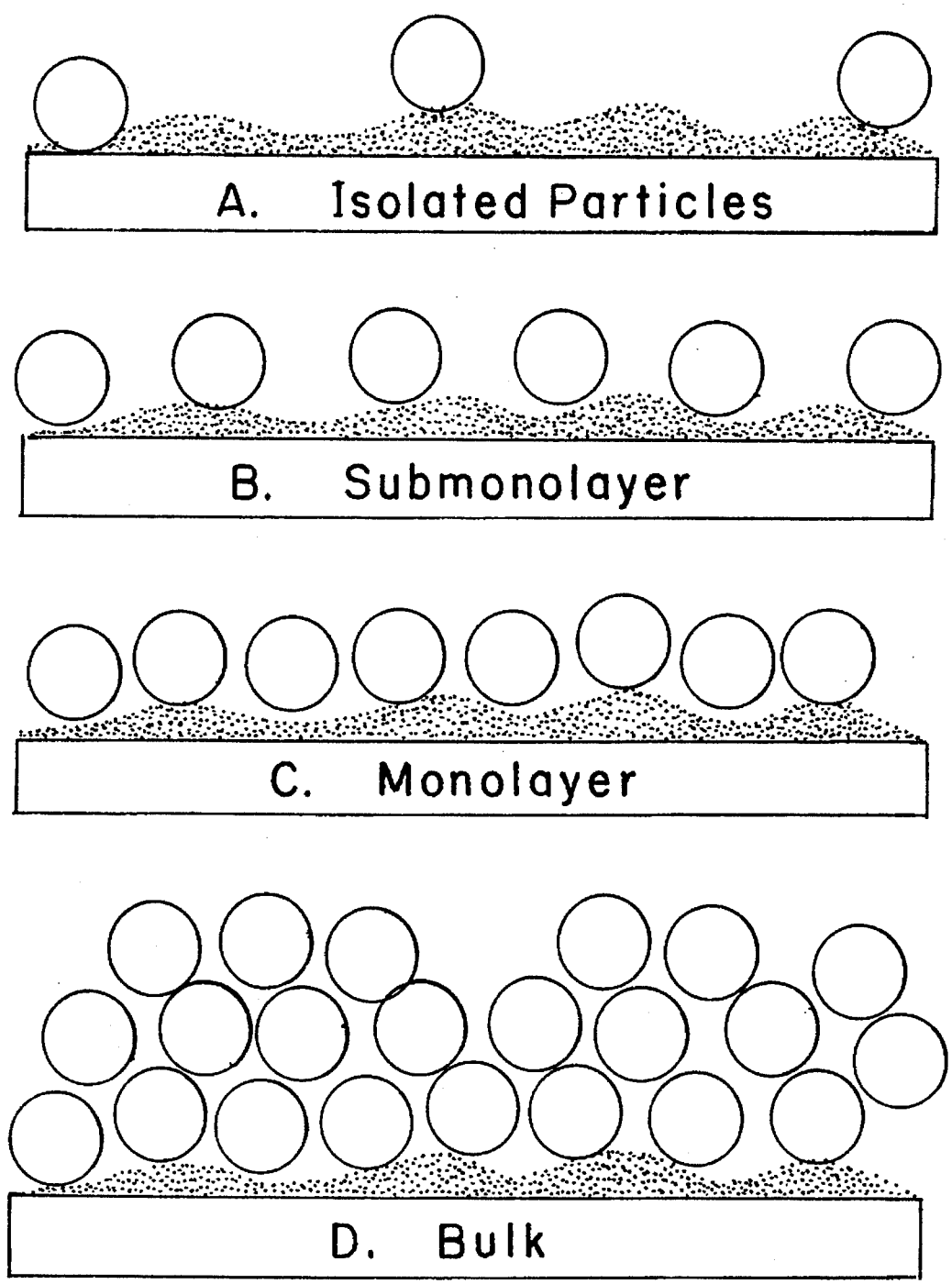
FIG. 1D depicts various degrees of substrate surface coverage by metal particles.
Figure 2A:
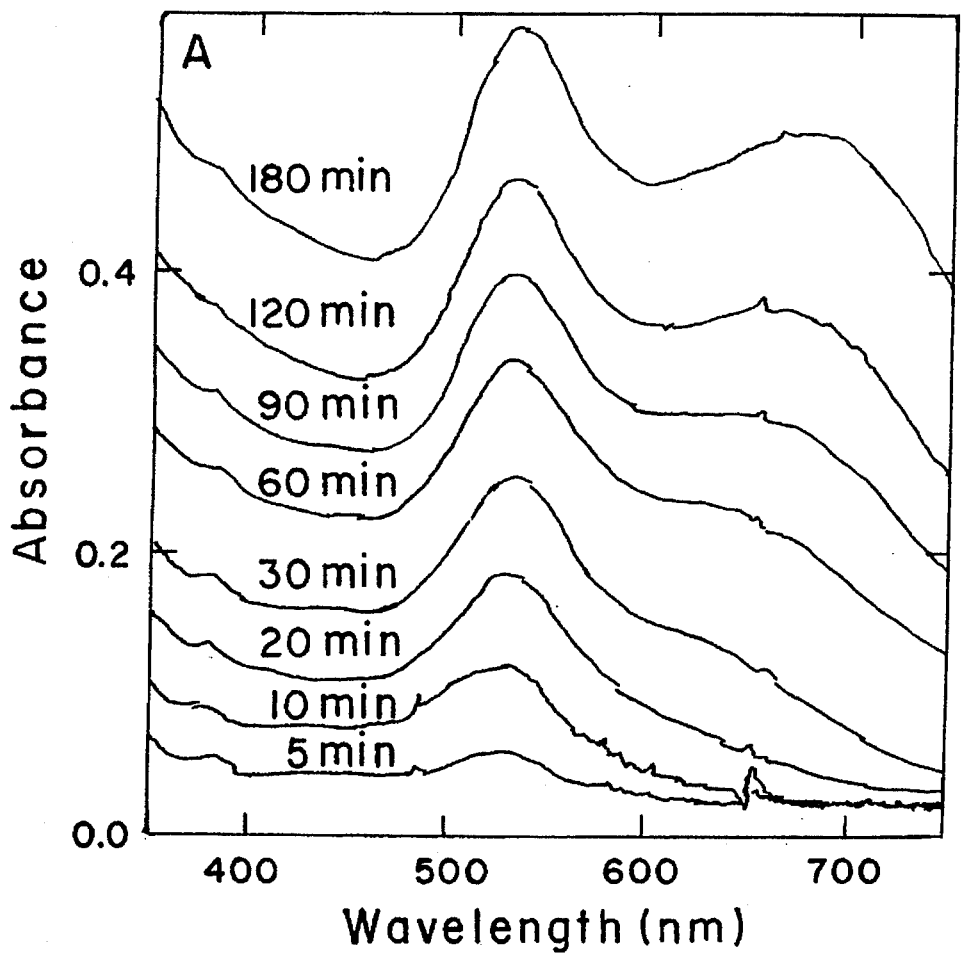
FIG. 2A illustrates the ultraviolet-visible kinetics of a Au colloid monolayer on a glass substrate coated with aminopropyltrimethoxysilane.
Figure 2B:
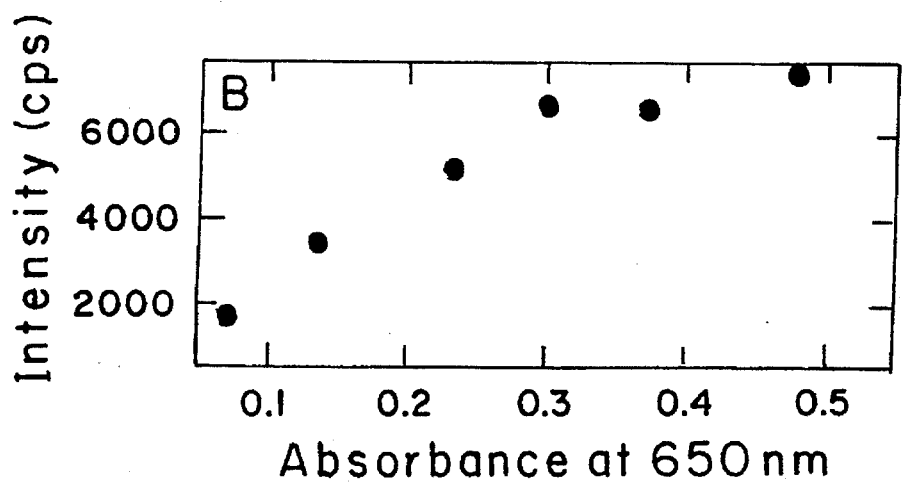
FIG. 2B illustrates the SERS kinetics of a Au colloid monolayer on a glass substrate coated with aminopropyltrimethoxysilane.

FIG. 2A shows kinetics of Au colloid monolayer formation by ultraviolet-visible (uv-vis). A series of uv-vis spectra of Au colloid-functionalized glass slides in H$_2$O obtained with an HP-8452A spectrophotometer. Cleaned (4:1 H$_2$SO$_4$:H$_2$O$_2$, 70° C.) rectangular glass slides (_0.9 mm×25 mm) were placed into a dilute solution of aminopropyltrimethoxysilane (APTMS) (0.3 ml: 3 ml of CH$_3$OH) for 12 hours and rinsed with CH$_3$OH upon removal. The polymer-coated slides were then immersed in a 17 nM solution of 12-nm diameter colloidal Au particles (wavelength maximum=520 nm) [Garrell, R. L. *Anal. Chem.* 1989, 61, 401A–11A; Tran, C. D. *Anal. Chem.* 1984, 56, 824–67,20]. At each time indicated (and at several others not shown), the slide was removed from the Au colloid solution, and an optical spectrum was recorded in H$_2$O, followed by a SERS spectrum in 4 mM BPE in 95:5 H$_2$O:CH$_3$OH (20 mW 632.8 nm, Spex 1403 double monochromator, Hamamatsu R928 photomultiplier tube, bandpass=7 cm$^{-1}$, scan rate=1 cm$^{-1}$s$^{-1}$, integration time=1 s). FIG. 2B shows kinetics of Au colloid monolayer formation by SERS. SERS intensity for the 1610 cm$^{-1}$ band versus absorbance at 650 nm. Other bands in the BPE SERS spectrum evolve with identical kinetics.

This high degree of control over surface formation has important ramifications for reproducibility, a long-standing complication in SERS research. For example, when BPE was adsorbed to eight identical Ag colloid monolayers on glass, the greatest variation in integrated peak intensity for the 1610 cm$^{-1}$ band was less than 8%. Similarly, for five different locations on a single substrate, the greatest difference was only 5%. As these values incorporate intrinsic errors associated with variation in laser power and sample positioning, the actual sample reproducibility is significantly better. This reproducibility extends to the nanometer scale, where Au and Ag colloid monolayers have been imaged using transmission electron microscopy (TEM), field emission scanning electron microscopy (FE-SEM), and atomic force microscopy (AFM). A representative TEM image of an Au colloid monolayer prepared on an SiO$_x$-coated Formvar surface is shown in FIG. 3. The Au particles are confined to a single layer, and the vast majority of particles are isolated from each other, unlike previous TEM studies of SERS-active Au and Ag colloids. Furthermore, the large field of view available with TEM allows us to conclude that particle aggregation has been eliminated over the entire sample. Similar conclusions obtain from large-field FE-SEM images and from multisite tapping-mode AFM images of Au-modified glass surfaces. The AFM image from a glass slide coated with 3-aminopropylmethyldimethoxysilane indicates a roughness of 1 to 3 nm, notwithstanding a few isolated locations where the polymer roughness approaches 8 to 10 nm. This roughness scale is typical for organosilane films on glass or quartz. Immobilization of 12-nm colloidal Au particles to a coverage equivalent to that shown for 180 to 210 min in FIG. 2 yields a surface with features 12 to 20 nm high and 20 to 30 nm wide. The increased dispersion in particle size relative to TEM results from convolution of the true particle size with the AFM tip size, but are nevertheless of sufficient quality to conclude that the surface is composed of a monolayer of separated particles, in agreement with FE-SEM images on similar substrates. Importantly, we have demonstrated that the spacing obtained on these colloid-based surfaces is sufficient to yield SERS enhancement. The bottom panel of FIG. 3B shows the SERS spectrum of BPE adsorbed onto the derivatized TEM grid pictured in the top panel. For comparison, the Raman scattering spectrum of an equivalent amount of BPE deposited onto an unmodified SiO$_x$-coated TEM grid is also shown. The intensity difference in these two samples clearly demonstrates the enhancing properties of colloid-based surfaces.

Figure 3A:
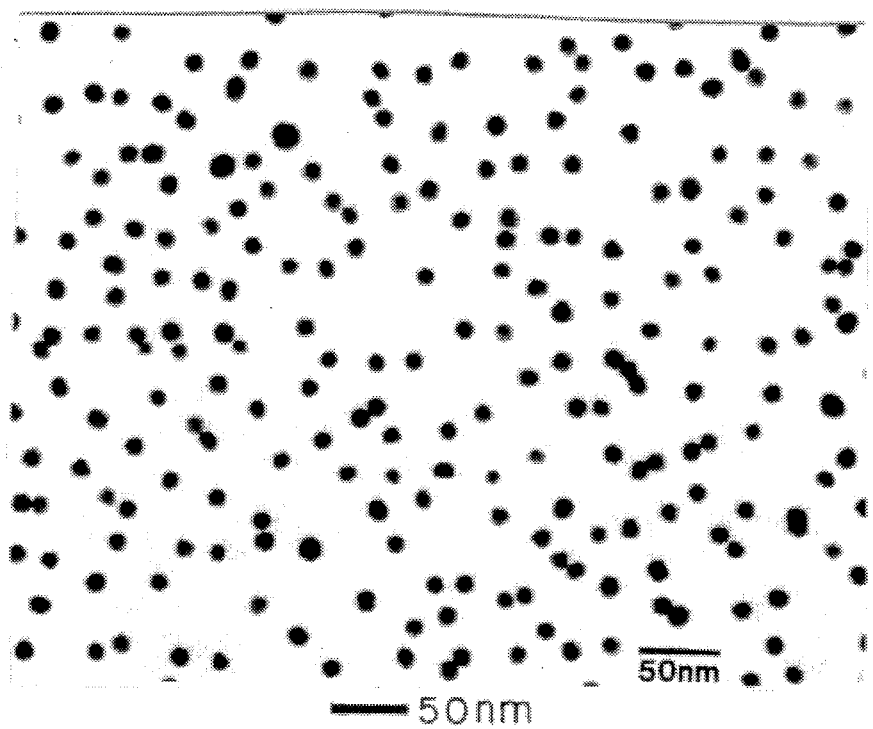
FIG. 3A is a TEM image of a Au colloid monolayer prepared on a $SiO_x$-coated formvar surface.
Figure 3B:
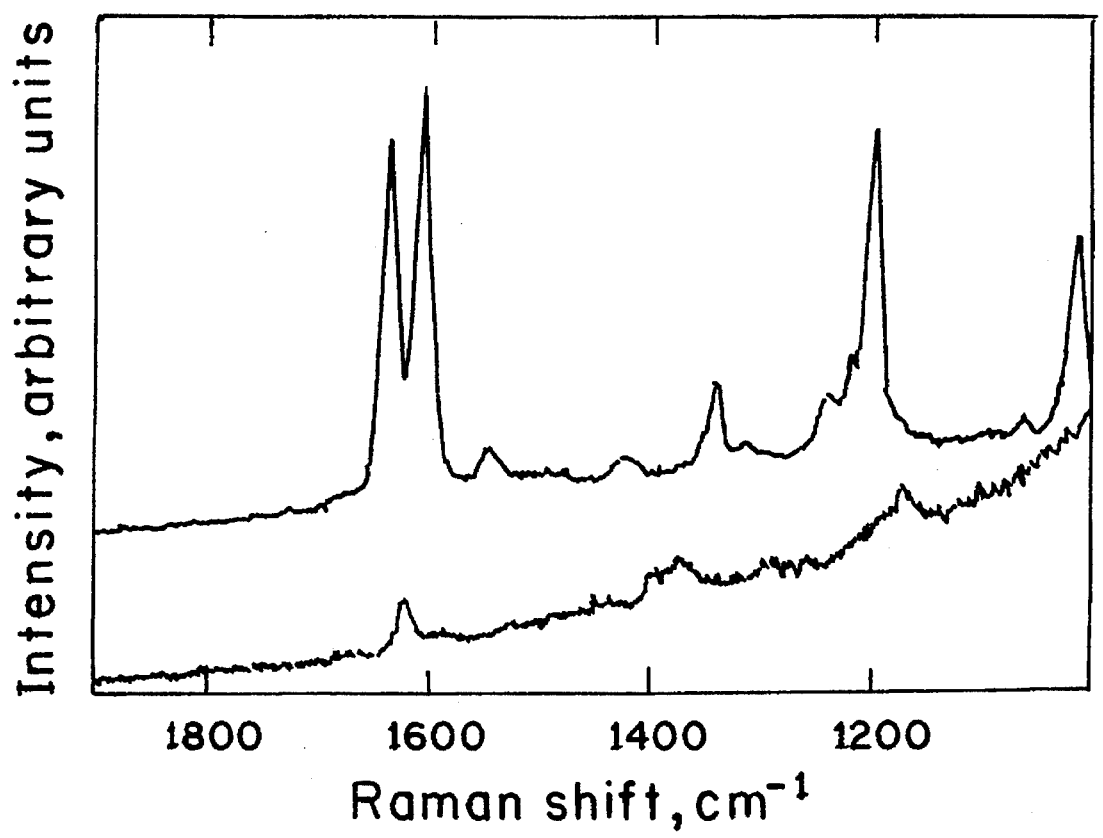
FIG. 3B shows the SERS spectrum of BPE adsorbed onto the derivatized TEM grid used to produce FIG. 3A.

FIG. 3A shows an image from a Formvat-coated Cu TEM grid which had been sputter-coated with a thin layer of SiO$_x$ (Ted Pella, Inc.), treated for 2.5 hours in neat 3-cyanopropyldimethylmethoxysilane, rinsed exhaustively with CH$_3$OH upon removal, and immersed for 12 hours in colloidal Au (12 nm diameter) [Garrell, R. L. *Anal. Chem.* 1989, 61, 401A–11A; Tran, C. D. *Anal. Chem.* 1984, 56, 824–6]. Imaging was performed on a JEOL 1200 EXII instrument operated at 80 kV accelerating voltage. The area depicted is 0.28 mm$^2$ and is representative of the sample surface. FIG. 3B shows a SERS spectrum (upper) of 5 ml of 1 mM BPE drop-coated onto the surface of the derivatized TEM grid (100 mW, 647.1 nm, 5 cm$^{-1}$ bandpass, 2 cm$^{-1}$ step, 2 s integration). For comparison, an identical quantity of BPE was drop-coated onto an underivatized SiO$_x$ grid; the Raman scattering from this sample is shown in spectrum (below) (1 cm$^{-1}$ step, 1 s integration).

Figure 4:
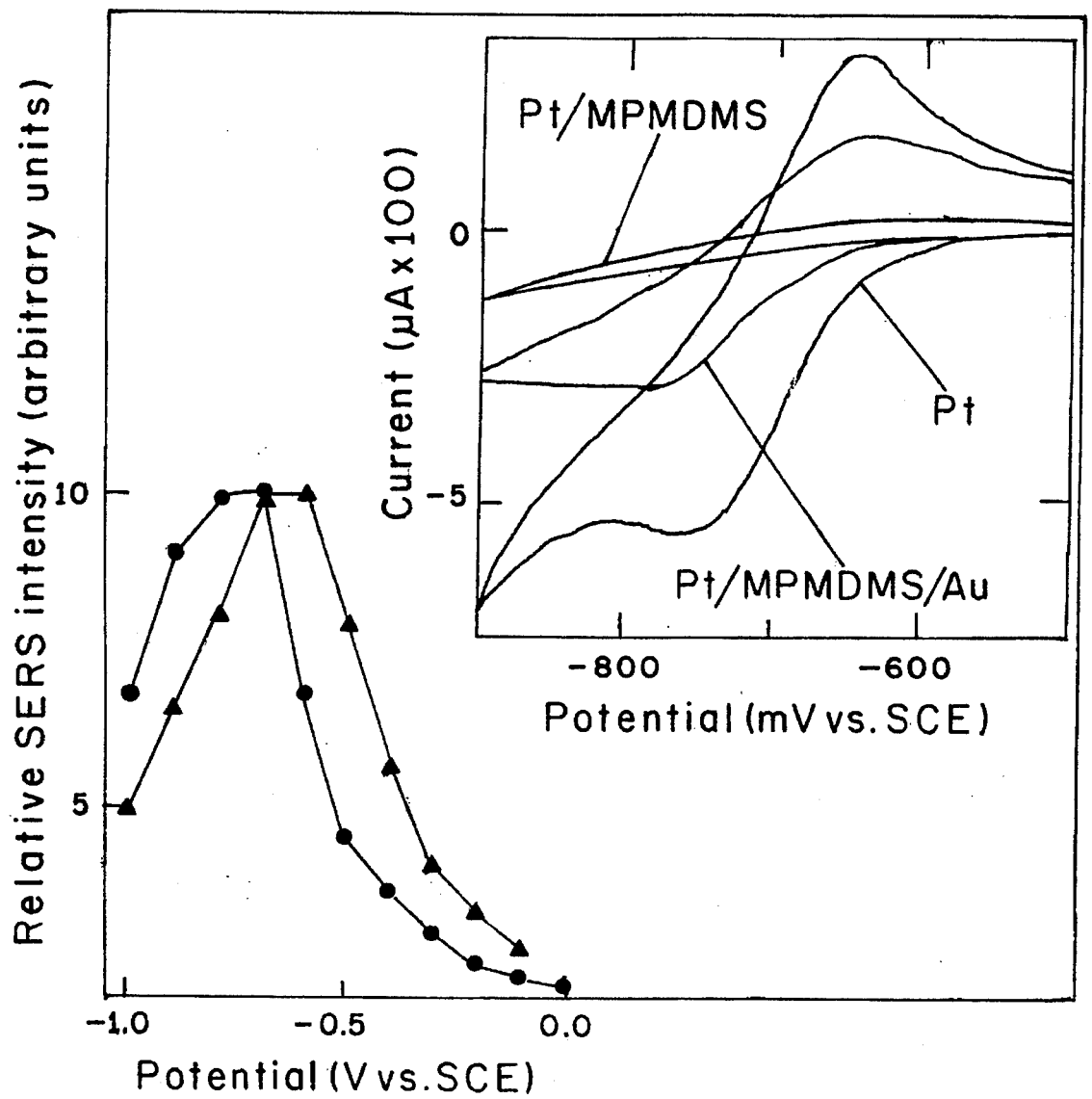
FIG. 4 shows the electrochemical potential dependence of SERS intensity of the 1006 $cm^{-1}$ band of pyridine on a Ag colloid monolayer on Pt and on bulk Ag.

Another important feature of film-supported metal colloid monolayers is that the particles are subject to electrochemical potentials applied to underlying conductive substrates. Consequently, like SERS-active electrodes, Ag colloids immobilized on Pt exhibit an electrochemical potential-dependent SERS intensity for adsorbed pyridine (FIG. 4). Identical maximas for the two surfaces in the intensity versus potential plots suggests that the voltage drop across the polymer film is minimal. Voltammetry at colloid-based surfaces also resembles that at macroscopic electrodes. The first reduction wave for methyl viologen (MV$^{2+}$) is markedly rectified at an organosilane-coated Pt electrode (FIG. 4, inset) but returns upon immobilization of Au particles. The slightly broadened peak-to-peak separation is expected for an array of closely spaced microelectrodes. Considering the demonstrated biocompatibility of 5 to 20 nm diameter Au particles, the ability to make electrochemical measurements at Au colloid monolayers suggests possible electrode-based biosensor applications.

FIG. 4 shows an electrochemical potential dependence of SERS intensity of the 1006 cm$^{-1}$ band of pyridine on an Ag colloid monolayer on Pt (1) and on bulk Ag (_) [Albrecht, M. G.; Creighton, J. A. *J. Am. Chem. Soc.* 1977, 99, 5215–7]. The monolayer was prepared as follows: Clean Pt foil was placed into neat APTMS for 4 hours. After rinsing with triply distilled H$_2$O and air-drying, the polymer-coated foil was dipped in Ag colloid solution [Soper, S. A.; Ratzlaff, K. L.; Kuwana, T. *Anal. Chem.* 1990, 62 1438–44] for 1 hour. The derivatized foil was then rinsed with triply distilled H$_2$O and air-dried. In the absence of colloidal Ag, no pyridine SERS spectra were observed at any potential. See FIG. 2 for spectral acquisition parameters. Inset: Voltammograms (100 mV/s, N$_2$ atmosphere) of 5 mM MV$^{2+}$ in 0.1M Na$_2$SO$_4$ on three surfaces: unmodified Pt, Pt coated with surface-polymerized 3-mercaptopropylmethyldimethoxysilane (MPMDMS), and Pt coated with MPMDMS and derivatized with 15-nm diameter Au particles (5 hours in neat silane, rinsed, 4 hours in colloidal Au).

Figure 5:
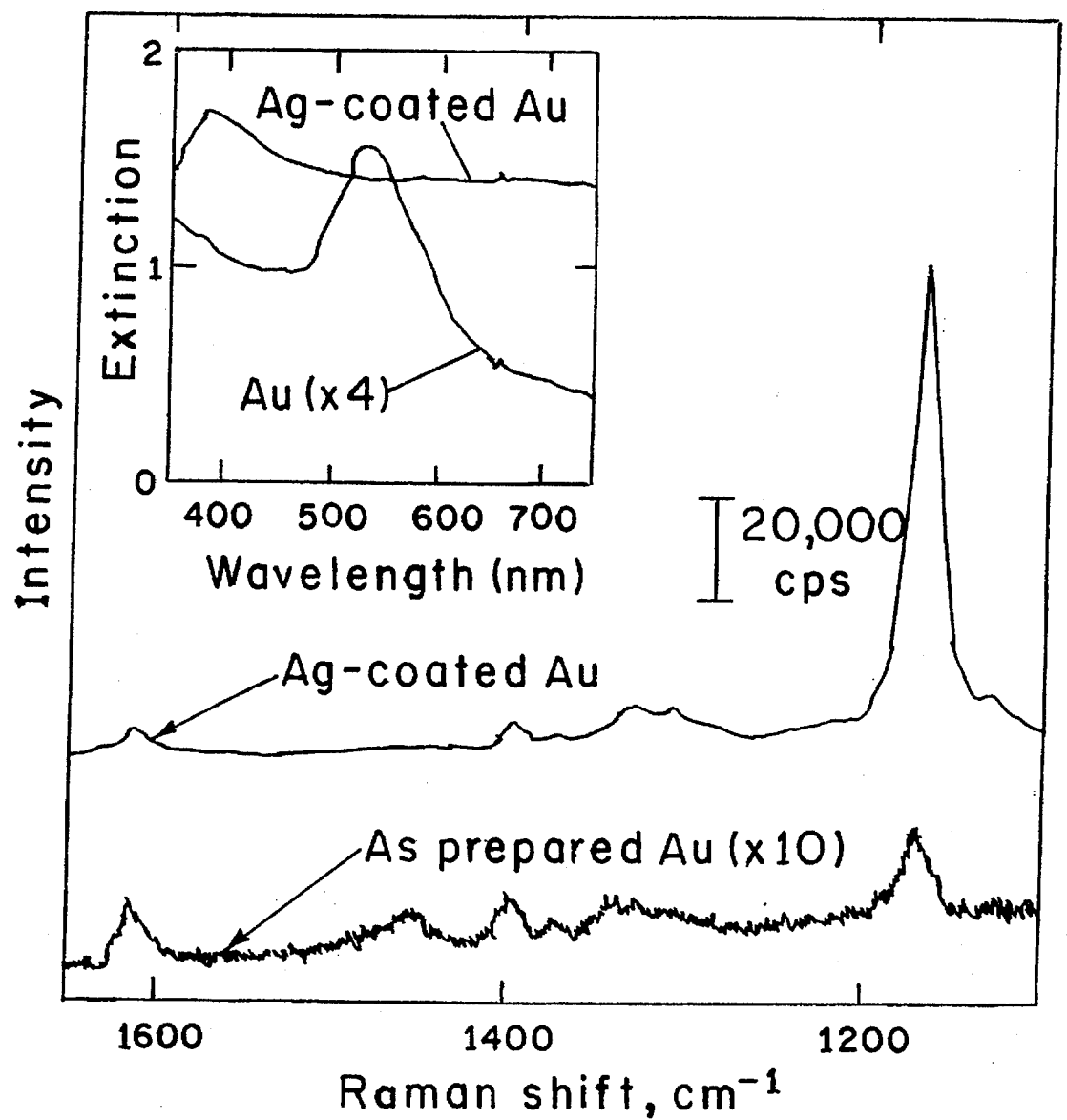
FIG. 5 shows the optical and SERS spectra before and after deposition of Ag onto 18 nm diameter colloidal Au monolayer.

Interparticle spacing in preformed Au monolayers can be further reduced by chemical deposition of an Ag coating; increased interparticle coupling because of decreased spacing and concomitant changes in dielectric properties lead to a dramatic increase in SERS activity. The optical and SERS spectra before and after deposition of Ag onto 18 nm diameter colloidal Au are shown in FIG. 5. Initially, relatively large interparticle spacing is indicated by the absence of a collective particle surface plasmon band in the ultraviolet-visible and by a weakly enhanced SERS spectrum for adsorbed para-nitrosodimethylaniline (p-NDMA). Silver deposition causes a large increase in extinction at all wavelengths as well as a shift in $\lambda_{max}$ from 520 to 386 nm. The shift in energy of and increased extinction at $\lambda_{max}$ concur with expectations based on a computer algorithm for predicting the optical properties of isolated coated particles [C. Bohren and D. R. Huffman, *Absorption and Scattering of Light by Small Particles* (Wiley, N. Y., 1983)]; best agreement between the experimental and model data is reached with a 4-nm Ag coat (to make 26-nm diameter particles) [The optical constants for Au and Ag were taken from R. H. Morriss and L. F. Collins, *J. Chem. Phys.* 41, 3357 (1961). These values were fit to exponential curves to generate continuous values between 300 and 700 nm]. The exceptional SERS activity (enhancement factor=$10^5$) [an enhancement factor (EF) of $5.7 \times 10^5$ was calculated for the Ag-coated surface by comparing the ratios of background-corrected intensities for a SERS spectrum and a solution spectrum in units of counts s$^{-1}$ watt$^{-1}$ molecule$^{-1}$, and averaging the EF values obtained for six different common peaks—low signal/noise precluded calculation of accurate EFs for the as prepared Au sample] of these substrates reflects optimization of the Ag coating thickness for this particular particle size and spacing of colloidal Au—even greater enhancements may be possible with other combinations.

FIG. 5 shows the effect of Ag coating on the uv-vis and SERS spectra of preformed Au colloid monolayers. The initial substrates were prepared as in FIG. 2, except that the organic film was formed from reaction with 2-(trimethoxysilyl)ethyl-2-pyridine (PETMS) for 24 hours. Silver coating was performed by immersing Au colloid monolayers into a 1:1 mixture of LI Silver enhancer and initiator solutions (Nanoprobes Inc., Stony Brook, N.Y.) for 13 min.

The SERS spectra were of 0.5 mM p-NDMA solutions in CH$_3$OH. Optical spectra (inset) were measured in H$_2$O. Instrumental parameters were described in FIG. 2. When Ag is deposited from the plating solution onto a PETMS-derived polymer on glass in the absence of colloidal Au, no SERS intensity could be observed for the same p-NDMA solution, irrespective of coating time.

More detailed characterization of these surfaces follows. The top panel of FIG. 6 shows optical spectra for solutions of isolated and aggregated 13-nm diameter colloidal Au particles in H$_2$O. The unaggregated sol, which has a particle concentration of 17 nM, has a $\lambda_{max}$ of 520 nm. The physical nature of this surface plasmon mode, which gives colloidal Au its characteristic intense burgundy color, is well-understood, as are its dependence on particle size and shape. When the interparticle repulsive forces are sufficiently screened by molecular adsorption, irreversible aggregation occurs and generates a new red-shifted feature in the optical spectrum centered between 600–800 nm. The intensity and $\lambda_{max}$ of this feature scale with the extent of aggregation, with large aggregates exhibiting increased extinction and red-shifted peaks. This "aggregated" band results from coupling of surface plasmons between closely-spaced particles. It has been amply demonstrated, both theoretically and experimentally, that the SERS-activity of aggregated colloidal Au arises from this interparticle coupling. aggregated sols, the particles are physically connected, but it is important to note that direct contact is not needed to observe collective plasmon modes: as long as the spacing between particles is small compared to the wavelength of light, these collective plasmon modes can be observed. Uv-vis is thus particularly well-suited for analyzing our samples, since the optical spectra of Au colloid monolayers on transparent substrates is easily measured. The same cannot be said of most SERS substrates with a notable exception being those prepared by Roark et al. [Roark, S. E.; Rowlen, K. L. *Appl. Spectrosc.* 1992, 46, 1759–61; Roark, Shane E.; Rowlen, K. L. *Chem. Phys. Lett.* 1993, 212, 50; Roark, Shane E.; Rowlen, K. L. *Anal. Chem.* 1994, 66, 261–70]. Moreover, colloid self-assembly provides a means of tuning surface optical properties through control of interparticle spacings.

The diversity of optical properties attainable through self-assembly of colloidal Au is illustrated in the bottom panel of FIG. 6. Use of two different organosilanes and two sizes of colloidal Au particles yields four distinct surfaces, as evidenced by different optical spectra. In comparison to the data in the top panel, it is clear that interparticle coupling is not as pronounced as for aggregated colloidal solutions. Using 13-nm diameter particles at 0.15 monolayer coverage, there are roughly $1 \times 10^{11}$ particles in a 1 cm$^2$ monolayer which, using a 15-nm slab thickness, are in a volume of $15 \times 10^{-10}$ liters. This translates to a surface concentration of $1 \times 10^{-4}$M, versus 17 nM in solution. Despite this 4 order-of-magnitude increase in concentration (one that cannot be maintained in solution without aggregation), the particles remain distinct; this lack of surface aggregation is additional strong evidence for specific interactions between the surface of Au and the polymer functional groups and the high stability suggests that multiple linkages must be present. These data are reinforced by the absence of Au or Ag immobilization on polymers derived from trimethoxypropylsilane, which lacks a high-affinity functional group. The key point is that the polymer-particle interaction, an adjustable parameter, controls the particle density, which in turn dictates the optical properties.

Figure 6A:
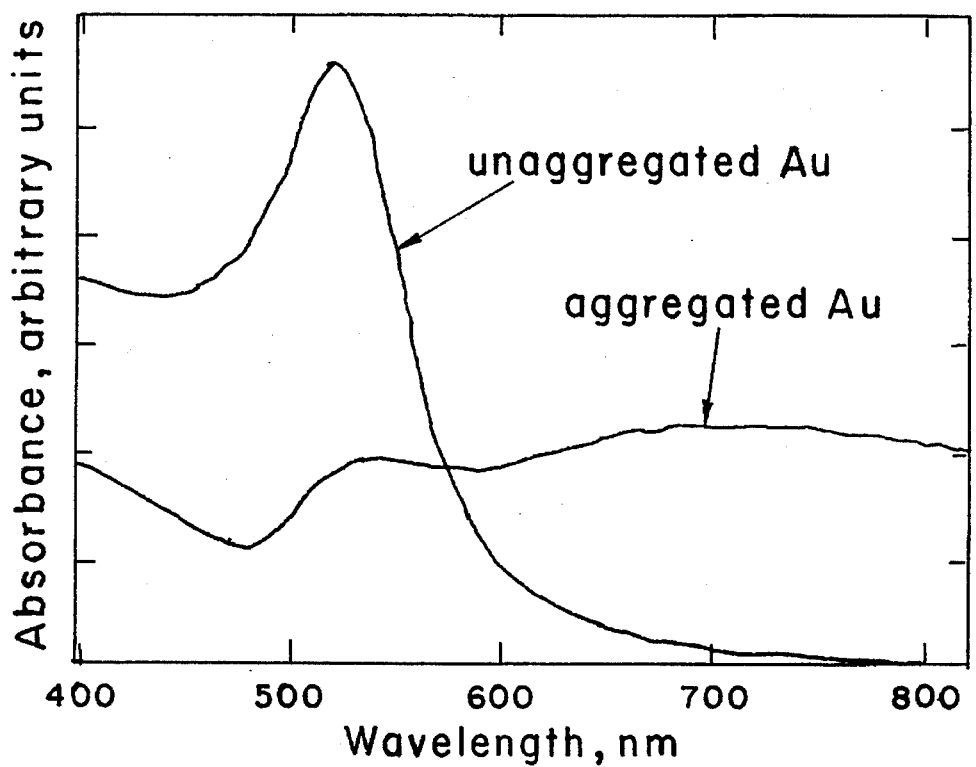
FIG. 6A shows optical spectra for solutions of isolated and aggregated 13 nm colloidal Au particles in $H_2O$.
Figure 6B:
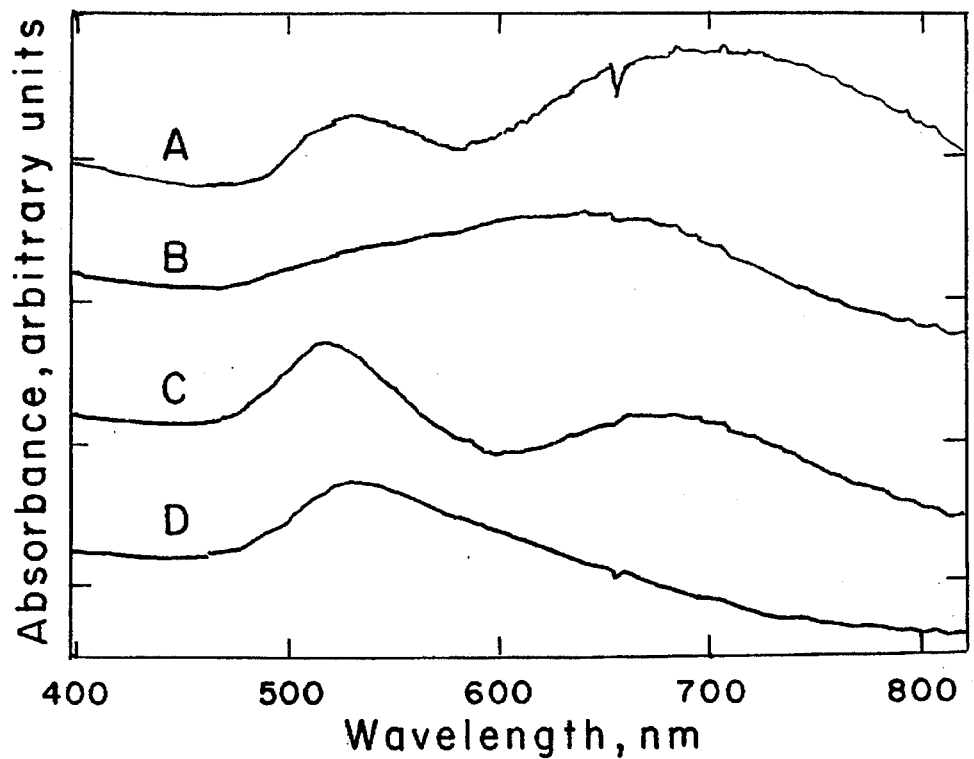
FIG. 6B illustrates the diversity of optical properties attainable through the method of the present invention.

FIG. 6A shows absorbance spectra for solutions of Au colloid (13 nm diameter). Unaggregated Au has a $1_{max}$ at 520 nm, while aggregated Au exhibits a second, red-shifted absorbance centered at 700 nm. The sol was aggregated via addition of a small volume of concentrated NaCl solution. FIG. 6B shows absorbance spectra of quartz slides derivatized for 14 h in neat silane and for 24 h in colloidal Au: (A) APTMS, 30 nm Au; (B) APTMS, 13 nm Au; (C) MPMDMS, 30 nm Au; (D) MPMDMS, 13 nm Au.

Thus, for surfaces with the same polymer and containing a single size of particle, difference in optical properties must be attributed to differences in coverage (and therefore, average interparticle spacing). For example, spectra B and D are of immobilized 13 m-diameter Au on quartz substrates derivatized with amino (APTMS)- and sulfhydryl (MPMDMS)-functionalized siloxane polymers, respectively. Relatively strong interparticle coupling is found in B, as evidenced by the presence of the collective surface plasmon absorbance feature, but is absent in D. Since the area probed by the uv-vis beam is constant, and since the Au particle coating is homogenous over the entire surface, the stronger interparticle coupling results from an increased particle density. Whether this difference is attributable to a higher concentration of pendant functional groups in surface-confined APTMS than for MPMDMS, an increased affinity of Au for amine over sulfhydryl, or some other factor is under investigation.

These surfaces are fundamentally different from those prepared by evaporation of drop-coated colloidal Au solutions. Evaporated substrates exhibit complete colloid aggregation, sometimes to the extent of producing films that to the eye look like bulk Au. In contrast, the protocol described herein involves no bulk aggregation on the surface. Furthermore, with adequate rinsing between the polymer formation and colloid derivatization steps, there is no aggregation of particles in solution; immersion of the polymer-functionalized substrate into a colloidal Au solution, and subsequent removal of the colloid-derivatized surface, does not appreciably change the optical spectrum of the colloidal Au solution. We have also shown that colloid iramobilization is not a sedimentation reaction by performing derivatizations upside down. Thus, immobilization of colloids on a polymer-functionalized glass substrate suspended upside down in solution yields colloidal surfaces indistinguishable from those obtained by complete immersion. Similarly, polymer-coated TEM grids can be derivatized with Au by flotation on aqueous colloidal solutions.

Figure 7:
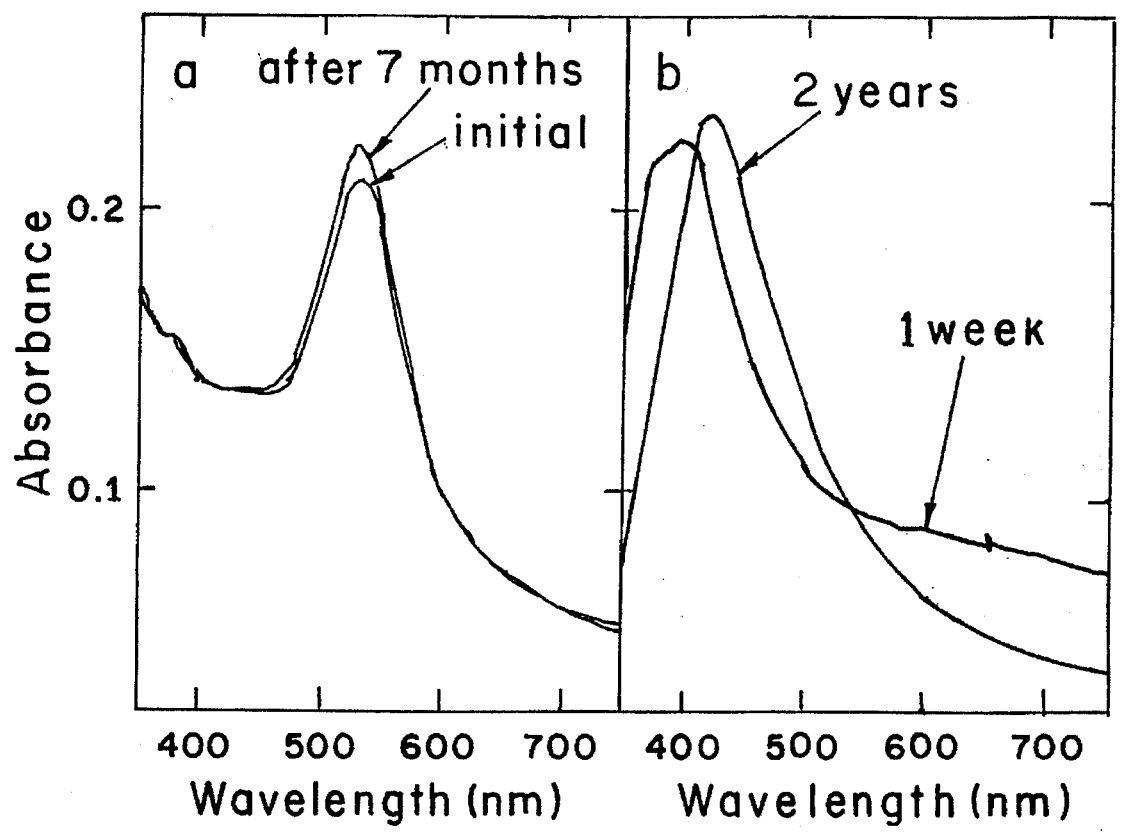
FIG. 7 illustrates the optical stability of the Au colloid-based monolayers of the present invention.

Once attached, the binding of colloidal Au to derivatized surfaces is extremely strong and essentially irreversible. There is very little change in the optical spectrum of an Au colloid-based monolayer after storage for 7 months in $H_2O$ (FIG. 7). Ag-based surfaces are also very durable, with no loss of particles over 2 years. For Ag, a shift of $\lambda_{max}$ from 396 to 420 nm may reflect particle aging, as has previously been shown for Ag colloids [Henglein, A. *J. Phys. Chem.* 1993, 97, 5457–71 and references therein. An alternative explanation for the shift is that bacterial growth in solution, against which no precautions were taken, leads to adsorption of protein on the particle surface (see FIG.3)]. More importantly, these surfaces are rugged enough to survive exposure to appreciable concentrations of aggregating agents. Thus, exposure of an MPMDMS-based Au colloid surface to 5 mM mercaptoethanol does not alter the optical spectrum, indicating that particle aggregation has not taken place (data not shown). It is significant that the same concentration of aqueous mercaptoethanol instantaneously aggregates colloidal Au and Ag in solution. The high durability of these substrates is further manifested by their resistance toward ligand exchange: solution $RS^-$ does not displace surface $RS^-$/Au bonds. Indeed, neat mercaptoethanol is needed to effect particle removal. Likewise, immersion of an Au-coated substrate into a solution of $H_2O$ at 75° C. for a period of one hour had no effect on the optical spectrum. Equivalent stabilities are found for surfaces based on $NH_2$-Au linkages.

FIG. 7A shows absorbance spectra for a glass slide derivatized for 24 h in APTMS (diluted 1:4 with $CH_3OH$) and for 11 days in colloidal Au (13 mm). FIG. 7B shows absorbance spectra for a glass slide derivatized for 14 h in neat MPMDMS and for 1 week in colloidal Ag. After the initial optical spectra were recorded, slides were stored in $H_2O$ until the final spectra were taken.

Figure 8:
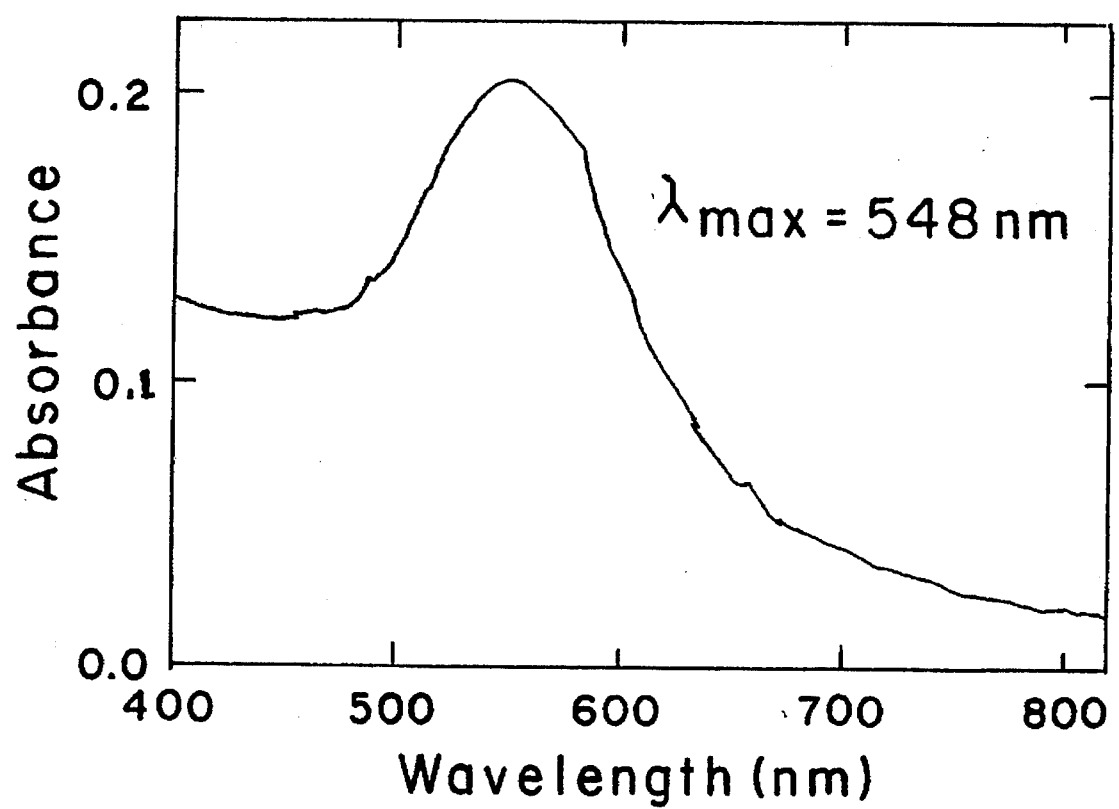
FIG. 8 shows the optical spectrum for a MP-biocytin coated quartz slide containing a monolayer of Au derivatized with BSA and streptavidin.

Surfaces based on non-covalent interactions (FIG. 1) possess optical properties completely analogous to those prepared by covalent attachment (FIG. 8). An important aspect of these data and of the concept described in FIG. 1 is that the biological activity (i.e. biotin binding) of streptavidin adsorbed on colloidal Au is necessarily retained: unmodified Au particles and particles coated completely with a protein that doesn't specifically bind biotin (i.e. BSA) do not lead to surface formation in the presence of biotinylated substrates. The retention of biological function contrasts sharply with streptavidin adsorbed at bulk Au surfaces, for which biological activity is compromised [Ebersole, R. C.; Miller, J. A.; Moran, J. R.; Ward, M.D. *J. Am. Chem. Soc.* 1990, 112, 3239–41]. The use of colloidal Au as a histochemical and cytochemical marker is based on the tendency of proteins adsorbed to small Au particles to retain their biological function. A major advantages of these surfaces, then, is their biocompatibility. Because they are composed of isolated colloidal particles, the behavior of the surface mirrors the behavior of particles in solution. The creation of macroscopic metal surfaces with high, nanometer-scale biocompatibility is important for biosensor applications, and reinforces the importance of maintaining some interparticle spacing, for only under these conditions can single particle behavior toward biomolecules be assured. A final comment on FIG. 1 concerns the use of a coating protein to completely isolate Au particles. For the data in FIG. 8, BSA was used, meaning that each particle had multiple BSA molecules adsorbed for each streptavidin bound. (Note the peak shift of roughly 20 nm for $1_{max}$, reflecting a change in local dielectric constant of proteins relative to $H_2O$) However, this choice is arbitrary; it should be possible to prepare particle-based Au surfaces where each particle is pre-coated with a protein of interest.

Transmission Electron Microscopy

Figure 9A:
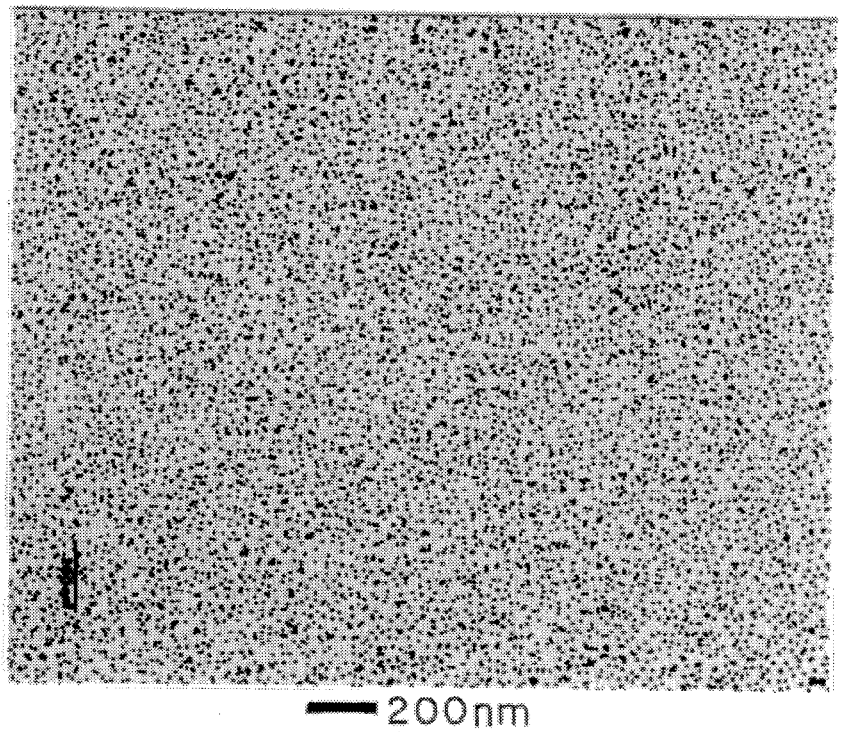
FIGS. 9A and 9B show TEM micrographs of a colloidal Au surface prepared by the method of the present invention.
Figure 9B:
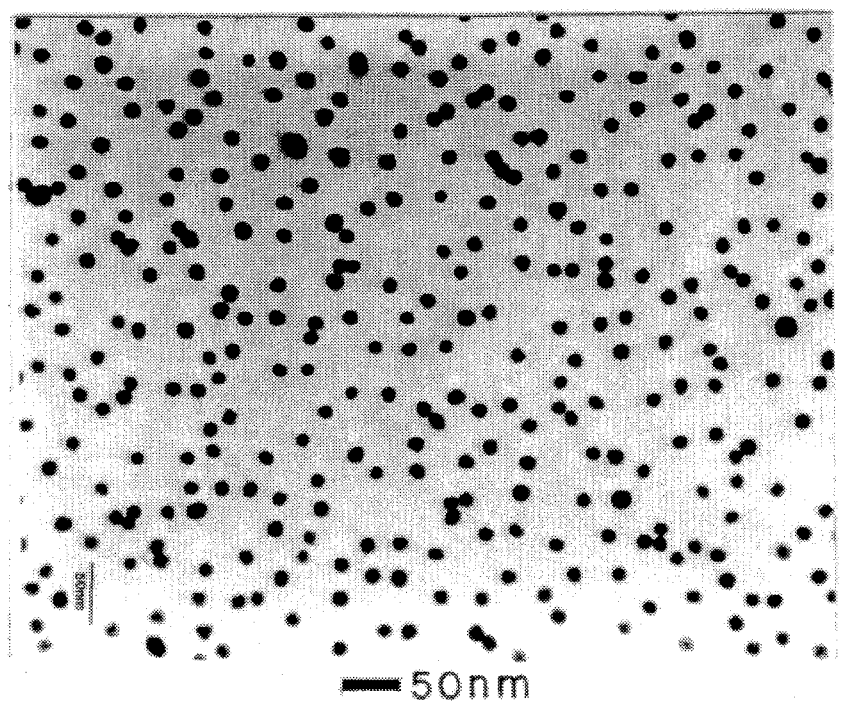

Direct evidence concerning the morphology and interparticle spacing comes from transmission electron microscopy studies of colloidal Au bound to polymers on TEM grids. These were prepared using commercially available formvar-coated Cu TEM grids possessing a thin sputter-coated overlayer of $SiO_2$. Careful treatment of these fragile surfaces with organosilane followed by colloidal Au yielded surfaces that could be directly imaged. FIG. 9A shows two magnifications of a surface derivatized in this manner with 13-nm colloidal Au. The areas shown in these micrographs are roughly 4.0 $mm^2$ for the top panel and 0.2 $mm^2$ for the bottom panel, and are representative of the entire sample. FIGS. 9, 9A & 9B show TEM micrographs of a colloidal Au surface prepared by derivatizing an $SiO_x$-coated TEM grid for 2.5 h in neat CPDMMS and for 12 h in 13 nm Au colloid. Areas depicted are approximately as follows: (top) 4.0 $mm^2$, (bottom) 0.2 $mm^2$.

Examination of these images verifies several critical aspects of the strategy delineated by FIG. 1: (1) there is a single two-dimensional submonolayer of colloidal Au; (2)

the particles are closely spaced but not aggregated in two dimensions; (3) the particle coverage is uniform over areas macroscopic compared to the particle size; (4) the roughness is uniform and defined solely by the particle diameter; and (5) there appears to be a limitation to the number of particles that can be bound per unit area, with only 15% of the surface covered. The observed distribution of particles extends over macroscopic areas, i.e. 3 mm×3 mm, the size of the TEM samples that we typically prepare.

Figure 9C:
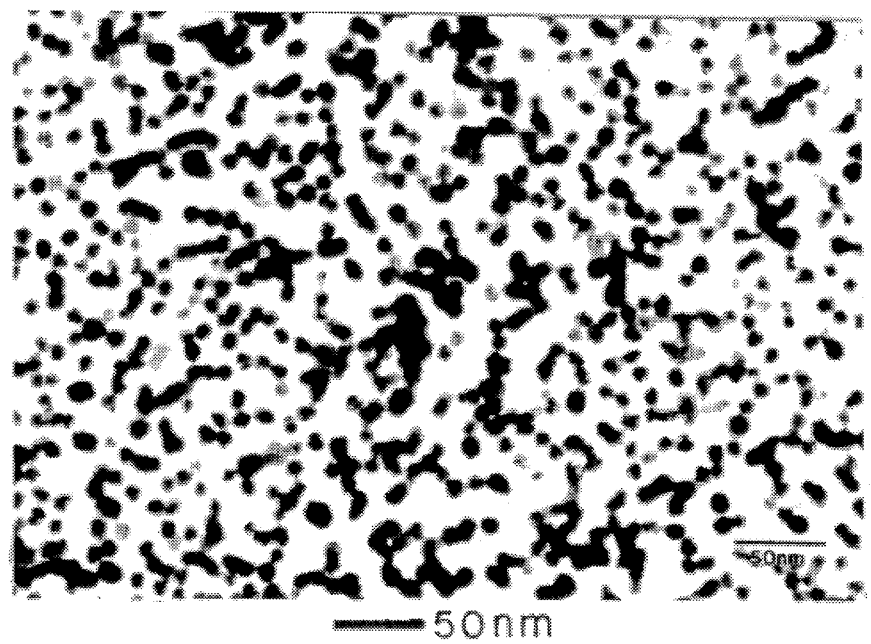
FIG. 9C shows a TEM micrograph of a formvar-coated TEM grid which was floated in colloidal Au for 2 days (not the method of the present invention).

It is well-known that aggregation of colloidal Au produces fractal clusters and strings. In the Creighton group's groundbreaking work on colloid SERS, two-dimensional strings of SERS-active particles were imaged by TEM [Jeanmaire, D. L.; Van Duyne, R. P. *J. Electroanal. Chem.* 1977, 84, 1–20]. Such species are not seen here, and the small percentage of dimers and trimers are invariably found in colloidal Au solutions as prepared. Weitz and co-workers have characterized the fractal dimension of aggregated Au and correlated it to SERS activity [Weitz, D. A.; Lin, M. Y. *Surf. Sci.* 1985, 158, 147–64]. Again, these large aggregates are not seen in images of carefully prepared surfaces. By way of contrast, FIG. 9C depicts a TEM image of colloidal Au on a non-functionalized, formvat-coated grid. Three-dimensional clusters of particles are clearly present in addition to isolated particles; the inability to achieve a good focus further signifies the existence of multiple layers of colloidal particles. Such species are not observed on the grids from which the data in FIGS. 9A and 9B was extracted. Rather, observation of closely-spaced, predominantly unaggregated colloidal particles confirms the arguments made above based on optical spectroscopy. The fact that all the colloidal particles are confined to nearly a single plane, as evidenced by good focus over large areas, suggests that for these surfaces, the roughness of the underlying organosilane film and/or substrate is comparable to the particle diameter or smaller. In accord with this notion, several studies of organosilane polymer films on smooth surfaces indicate a thickness <20 Å [Dressick, W. J.; Dulcey, C. S.; Georger, J. H., Jr.; Calabrese, G. S.; Calvert, J. M. *J. Electrochem. Soc.* 1994, 141, 210–20; Karrasch, S.; Dolder, M.; Schabert, F.; Ramsden, J.; Engel, A. *Biophys. J.* 1993, 65, 2437–46; Nakagawa, T.; Ogawa, K.; Kurumizawa, T. *Langmuir* 1994, 10, 525–9].

The tendency toward even spacing between particles observed in FIG. 8 results from electrostatic factors. It is known that colloidal particles are negatively charged and thus naturally repel one another, and that aggregation occurs only under conditions where this interparticle repulsion is screened. Within this framework, the protocol described here is self-assembly, in that long range order arises from secondary interactions between individual particles, as opposed to particle-surface interactions.

Surface Enhanced Raman Scattering (SERS)

Figure 10A:
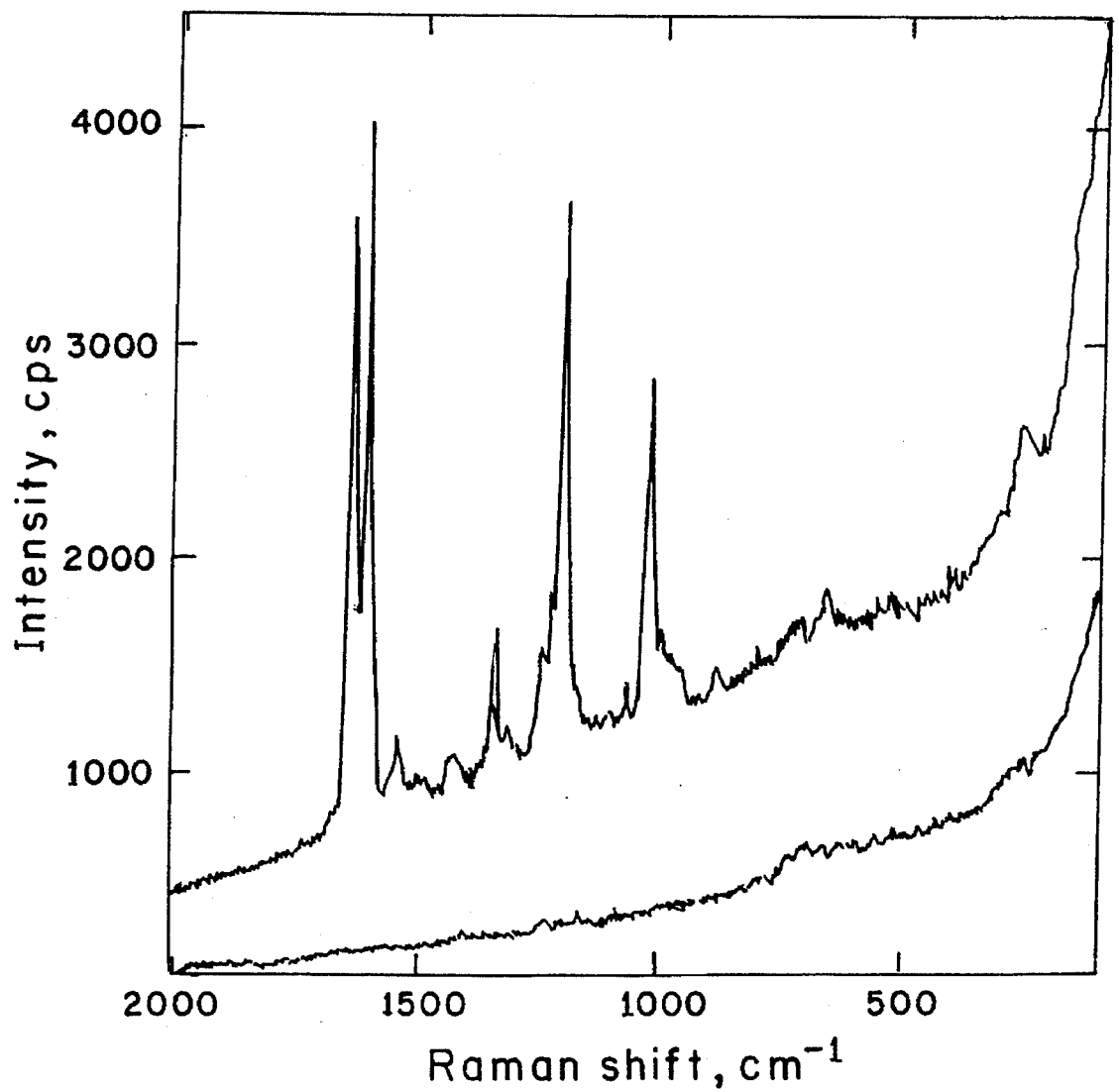
FIG. 10A shows a SERS spectrum of BPE drop-coated on a colloid Au monolayer on a functionalized TEM grid, as well as the SERS spectrum of the adsorbate-free surface.

One of the principle objectives of assembly of macroscopic metal surfaces exhibiting controlled roughness is to prepare well-defined, reproducible SERS-active substrates. The optical spectra show that the particle spacing is small compared to 1, suggesting that these particle arrays should be SERS-active. FIG. 10A shows the SERS spectrum of 5 nmol of BPE drop-coated onto a colloid monolayer on a functionalized TEM grid, as well as the SERS spectrum of the adsorbate-free surface. These data are extremely significant because they were obtained on the same type of surface imaged by TEM in FIG. 8. In the absence of adsorbate, no major features are observed in the Raman spectrum, indicating SERS from the polymer underlayer is weak. Typically, a low energy mode is observed for the S-Au vibration from MPMDMS-derived films, but little else is easily discerned.

Figure 10B:
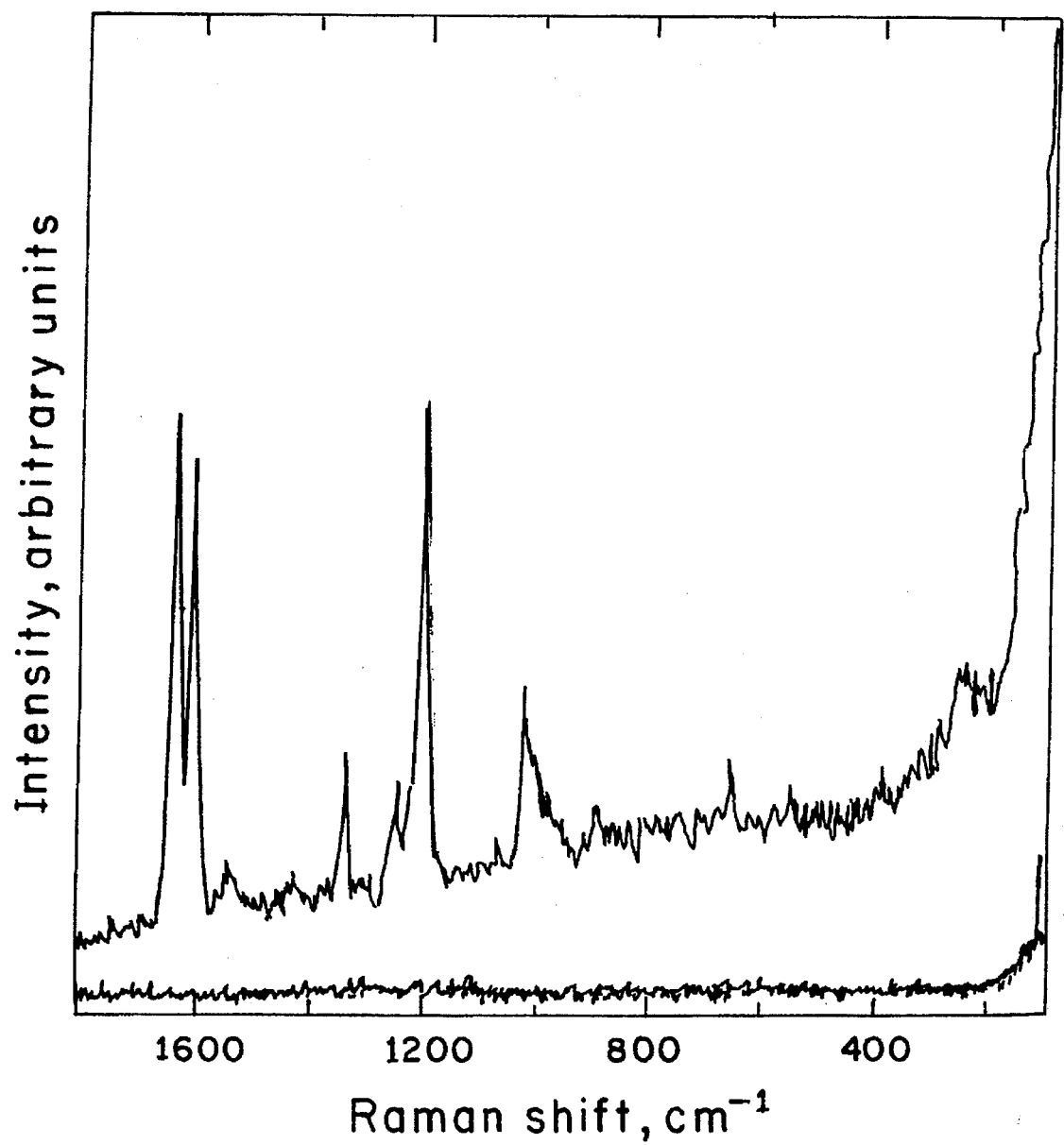
FIG. 10B shows a SERS spectrum of BPE drop-coated on a colloid Au monolayer on a $HO_2C(CH_2)_{18}SH/Au/Cr/Si$ substrate, as well as the SERS spectrum of the adsorbate-free surface.

FIG. 10A shows SERS spectrum of 5 ml of 1 mM BPE drop-coated onto an $SiO_x$ coated TEM grid derivatized with MPMDMS and 10 nm colloidal Au. Excitation source: 647.1 nm, 100 mW; 2 $cm^{-1}$ step, 2 s integration; 5 $cm^{-1}$ bandpass. The bottom spectrum was taken of the substrate surface prior to adsorption of BPE. The surface topography was identical to that depicted in FIG. 2. FIG. 10B shows SERS spectrum of BPE (10 ml, 1 mM in $CH_3OH$) drop-coated onto a colloidal Au (10 nm diameter) monolayer prepared on a $HO_2C(CH_2)_{18}SSH/Au/Cr/Si$ substrate (upper). Prior to adsorption of BPE, a background spectrum of the colloidal Au substrate was run (lower). Excitation source: 647.1 nm; 150 mW (BPE), 100 mW (background); 2 $cm^{-1}$ step, 1 s integration; 5 $cm_{-1}$ bandpass.

It is important to understand the factors responsible for the observed SERS behavior of these substrates: why do we see BPE and not the polymer underlayer? Most SERS studies of polymers show a number of polymer-related bands. However, in those studies, the polymers completely surrounded the colloidal particles, while in this work, if the idealized geometry in Scheme I is reasonable (as the TEM data in FIG. 8 suggest is the case), only a small fraction of the colloid surface contacts polymer. For a particle with diameter=2r, the fraction of a spheres surface area covered by a polymer with x nm vertical flexibility (over a horizontal distance 2r) is equal to:

$$\frac{\cos^{-1}[(r-x)/r]}{p} \quad (1)$$

In our system, using r=6 nm and x=1 nm (a vast overestimate, considering the length of the $—CH_2CH_2CH_2A$ tail is itself<1 nm), the fraction of total surface area exposed to polymer is 0.186. In other words, the ratio of adsorbate molecules at monolayer coverage to polymer tails is at minimum 5:1, and more likely closer to 10:1.

Another factor influencing the SERS enhancement is the Raman scattering cross-section. BPE is an exceptionally strong scatterer, while alkanes yield very weak Raman spectra. Bryant et al. have measured SERS spectra of octadecanthiols on Au foil; using a CCD, very long (10 min) integration times were required. A third consideration is the magnitude the electric fields responsible for the electromagnetic enhancement. The largest fields are expected to occur in the plane of the particles, not in the plane normal to the substrate, i.e. Raman spectra of molecules adsorbed in this region are enhanced to a greater extent than those adsorbed elsewhere, and from our calculations above, only BPE can access this region. Finally, chemical enhancement effects in SERS certainly favor observation of enhanced Raman scattering from the nitrogen-containing BPE versus an alkane. The combination of these factors all favor observation of BPE SERS, and help explain the consistently observed finding that, over the region between 400–1700 $cm^{-1}$, very weak or no SERS spectra are seen for underlying films. A benefit of these substrates is thus the lack of background spectra, simplifying the data acquisition process. On the other hand, these substrates, like many others previously described, may not be sufficiently enhancing to measure Raman spectra for weak scatterers or poor adsorbates.

Because the Raman intensity of BPE adsorbed onto organosilane-coated glass slides is too small for us to measure, we crudely estimated how enhancing these surfaces are by comparing the solution concentration [x] of BPE needed to yield the same normal P-aman spectrum as we obtained for a BPE concentration [y] in the presence of an Au colloid monolayer. Typically, $x/y \geq 10^4$. This number is in line with enhancements measured at toughened Au electrodes. The spectra yielding these enhancement factors (data not shown) are less than a factor of ten more intense than the data in FIG. 10A. Thus, enhancement factors of >1000 can routinely be obtained from arrays of closely spaced but non-contacting particles. Importantly, identical spectra are obtained on substrates in which BPE was adsorbed from solution; in fact, our experiments are routinely carded out in this fashion.

Below are experimental details associated with colloid monolayer preparation: Materials. The following materials were obtained from Aldrich: $HAuCl_4 \cdot 3H_2O$, $AgNO_3$, trisodium titrate dihydrate, trans-1,2 bis(4-pyridyl)ethylene (BPE), and trimethoxy-propylsilane. The following organosilanes were obtained from Hüls America, Inc., and used as received: (3-aminopropyl)trimethoxysilane (APTMS), (3-cyano propyl dimethyl)methoxysilane (CPDMMS), (3-mercaptopropylmethyl)dimethoxysilane (MPMDMS), and 3-cyanopropyltriethoxysilane (CPTES). Concentrated HCl, $HNO_3$, and $H_2SO_4$ were purchased from J. T. Baker Inc., and 30% $H_2O_2$ was obtained from VWR. $CH_3OH$ (spectrophotometric grade) was obtained from EM Science; all $H_2O$ was 18 MW, distilled through a Barnstead Nanopure water purification system. Streptavidin, bovine serum albumin (BSA), and 3-(N-maleimidopropionyl)biocytin (MP-biocytin) were purchased from Sigma. BPE was recrystallized several times from a mixture of $H_2O$ and $CH_3OH$; the other materials were used as received. Substrates were obtained as follows: glass and quartz microscope slides from Fisher Scientific and Technical Glass Products, respectively; $SiO_x$-coated TEM grids from Ted Pella, Inc.; and self-assembled monolayers (SAMs) of $HS(CH_2)_{18}CO_2H$ on Au foil from literature procedures [Bain, C. D.; Troughton, E. B.; Tao, Y.-T.; Evall, J.; Whitesides, G. M.; Nuzzo, R. G. *J. Am. Chem. Soc.* 1989, 111, 321–35].

Colloid Preparation. All glassware used in these preparations was thoroughly cleaned in aqua regia (3 parts HCl, 1 part $HNO_3$), rinsed in triply-distilled $H_2O$ and oven-dried prior to use. Au colloids were prepared according to Erens [Frens, G. *Nature Phys. Sci.* 1973, 241, 20–2] or Sutherland [Sutherland, W. S.; Winefordner, J. D. *J. Colloid. Interface Sci.* 1992, 48, 129–41] with slight modifications. The following stock solutions were prepared from triply-distilled $H_2O$ that had been filtered through a 0.8 mm membrane filter (Gelman Scientific): 1% $HAuCl_4$, 38.8 mM sodium citrate, and 1% sodium citrate. Other solutions were made fresh as needed using triply-distilled, filtered $H_2O$. Two typical Au preparations and one Ag preparation are described below.

Preparation I: Using a 1 L round bottom flask equipped with a condenser, 500 ml of 1 mM $HAuCl_4$ was brought to a rolling boil with vigorous stirring. Rapid addition of 50 ml of 38.8 mM sodium citrate to the vortex of the solution resulted in a color change from pale yellow to burgundy. Boiling was continued for 10 minutes; the heating mantle was then removed, and stiffing was continued for an additional 15 minutes. After the solution reached room temperature, it was filtered through a 0.8 mm Gelman Membrane filter. The resulting solution of colloidal particles was characterized by an absorption maximum at 520 nm. Transmission electron microscopy (TEM indicated a particle size of 13 nm±1.7 nm(100 particles sampled). Preparation II: In a 1 L round bottom flask equipped with a condenser, 500 ml of 0.01% $HAuCl_4$ was brought to a boil with vigorous stirring. To this solution was added 7.5 ml of 1% sodium titrate. The solution turned blue within 25 s; the final color change to red-violet occurred 70 s later. Boiling continued for an additional 10 min., the heating source was removed, and the colloid was stirred for another 15 min. TEM data indicated an average diameter of 18 nm±4.6 nm (89 particles sampled). Particle diameter was varied by adding larger or smaller amounts of sodium citrate to decrease or increase the particle size.

Ag colloid was prepared according to Lee and Meisel [Lee, ;P. C.; Meisel, D. *J. Phys. Chem.* 1982, 86, 3391–3395]. Using a heating plate and a 1 L flask, a solution of 90 mg $AgNO_3$ in 500 ml of triply distilled $H_2O$ was brought to boiling with rapid stirring. To this solution was added 10 ml of 1% sodium titrate. Boiling continued for 30 min, after which time the flask was removed from the heat source, and the solution was diluted with triply distilled $H_2O$ to obtain a final volume of 420 ml.

All colloids were stored at room temperature in dark bottles and were generally used within 1–2 months after preparation. Samples for particle sizing by TEM were prepared by drop coating 10 ml of the colloid onto a formvat-coated Cu grid and allowing the sample to dry. Average sizes were determined by measuring diameters along a consistent axis throughout the sample.

Protein-Colloid Conjugates

Streptavidin-labelled Au particles were prepared using modifications of literature protocols [Liesi, P.; Julien, J.-P.; Vilja, P.; Grosveld, F.; Rechanrdt, L. *J. Histochem. Cytochem.* 1986, 34, 923]. To 25 ml of colloidal Au (preparation I) were added 0.725 ml of streptavidin (0.34 mg/ml in triply distilled $H_2O$) and 0.241 ml of BSA (7.24 mg/ml in triply distilled $H_2O$). The protein-Au conjugates were observed to sediment within 24 hours.

Surface Derivatization

Substrates were cleaned prior to derivatization as follows: glass and quartz, cut to dimensions of approximately 2 cm×0.7 cm, were cleaned for 10 minutes in a bath consisting of 4 parts $H_2SO_4$ to 1 part 30% $H_2O_2$ at 60° C. The samples were rinsed in spectrophotometric grade $CH_3OH$ and stored in this solvent until needed. $SiO_x$-coated TEM grids were cleaned in an ozone plasma for 30 min using a home-built instrument. Cleaning often preceded use of the grids by several weeks; during this period, the grids were stored in TEM grid holders in air.

Derivatization of glass and quartz substrates with alkoxysilanes was accomplished in the following manner: Clean substrates were submerged into vials of silane diluted 1 part to 4 parts with spectrophotometric grade $CH_3OH$. After a period of 24 h, the substrates were removed and rinsed profusely with $CH_3OH$ to remove unbound monomer from the surface. At this point, silanized substrates were stored in $CH_3OH$ until needed. Prior to derivatization with colloidal Au, the substrates were rinsed with $H_2O$; they were then immersed in vials of colloidal Au for 24 h. A final $H_2O$ rinse concluded the derivatization process. Similarly, carboxyl-terminated SAMs prepared on Au-coated silicon substrates were immersed in colloidal Au solutions for several days. The substrates were stored in $H_2O$ until needed for analysis.

Due to their inherent fragility and small size, greater care was required for the derivatization of TEM grids. Specifically, the $SiO_x$-coated TEM grids were immersed in neat silane for 3 h, followed by extensive methanol rinses and a $H_2O$ rinse. The rinsing was accomplished by pipetting solvent across the grid surface, or by swishing the grid back and forth in a vial of solvent. Effort was made to minimize the solvent flow perpendicular to the grid face in order to better preserve the formvar film. Finally, the grids were floated on a colloid solution for 12 h. Samples were rinsed with $H_2O$ and allowed to air dry on filter paper prior to analysis.

Sample Preparation

Two methods were employed for mounting the substrates for SERS detection. The first method involved mounting the substrate via double-sided tape to a black mount positioned in the laser beam (TEM grids, SAM substrate). In the second, the substrate (glass or quartz) was supported in the front of a quartz cuvette by means of a teflon block whose height was only ⅓ that of the sample. This cuvette could be filled with solvent or empty. The cuvette rested in a snug, home-built cuvette holder. Both sample configurations were mounted on a stage such that the sample position could be adjusted in all three dimensions. For measurements carried out in air, solutions of BPE in $CH_3OH$ were drop-coated onto the substrate surface and allowed to evaporate; alternatively, the cuvettes were placed in cuvettes containing known concentrations of BPE.

Instrumentation

SERS spectra were obtained with a Coherent $Kr^+$ ion laser, model 3000K, operated at 647.1 nm in $TEM_{00}$. Spectral scanning and detection were accomplished through the use of a Spex Model 1404 scanning double monochromator with a pair of 1800 grooves/mm gratings and a thermoelectrically-cooled Hamamatsu R928 photomultiplier tube housed in a Products for Research casing. Monochromator entrance and exit slits were typically set at 700 mm, and center slits were set at 1400 mm to yield an effective band pass of 5 $cm^{-1}$ Grating movement and spectral acquisition were controlled using the DM3000 software provided by Spex. Plasma lines were filtered out of the incident laser beam through the use of a band pass filter (Ealing ElectroOptics) or a pre-monochromator tuned to the 647 nm line (Optometrics). The laser beam was focused onto the substrate sample at an angle of<30° from the surface normal. Scattered radiation was collected and collimated with a Minolta 50 mm camera lens (f#1.2) and focused through a polarization scrambler (Spex) onto the entrance slits of the monochromator.

Absorption spectra were obtained using a Hewlett-Packard 8452A diode array spectrophotometer (2 nm spectral resolution, 1 s integration time). Again, substrates in quartz cuvettes were maintained in an upright position through the use of a teflon block. Transmission electron microscopy was performed on a JEOL Model 1200 EXH instrument operating at 80 kV accelerating voltage; the images were not manipulated, altered, or enhanced in any way.

Below are eight (8) further examples of colloid monolayer experimental protocols:

EXAMPLE 1

Surfaces made from seeded colloidal Au particles.

Glass slides (2.5 cm×0.8 cm×1 mm) were cleaned in a mixture of $HCl:HNO_3$ (3:1). Slides were rinsed in $H_2O$ and $CH_3OH$ prior to derivatization for 18 h in a solution of aminopropyltrimethoxysilane (diluted 1:5 in $CH_3OH$). The derivatized surfaces were rinsed extensively in $CH_3OH$ and $H_2O$ prior to immersion in solutions of colloidal are described below. After 24 hours, the colloid derivatization was complete.

Au nuclei were prepared by adding 1 ml of 1% $Na_3$ citrate to a vigorously stirring solutions of 0.01% $HAuCl_4$. After 1 min., 1 ml of a solution of composition 0.075% $NaBH_4$ and 1% $Na_3$ citrate was added. Reaction continued for five minutes. The solution of nuclei was stored at 4° C. until needed.

The first seeded colloid was prepared by refluxing 1 ml of 1% $HAuCL_4.3H_2O$ with 100 ml of 18MΩ water with vigorous stirring. 0.4 ML of 1% $Na_3$Citrate and 30 μL of the above described nuclei was added rapidly and boiled for an additional 15 minutes followed by cooling to RT. The resulting colloid was stored in a dark bottle.

A second seeded colloid was prepared by an identical method using 15 μl of nuclei instead of 30 μl.

| Colloid | Major | Minor | Std. Dev. | # of Part. |
|---|---|---|---|---|
| Nuclei | 2.64 | 2.03 | 1.04 | 131 |
| Seeded #1 | 52.7 | 43.7 | 5.24 | 70 |
| Seeded #2 | 93.4 | 68.0 | 20.0 | 16 |

Figure 11:
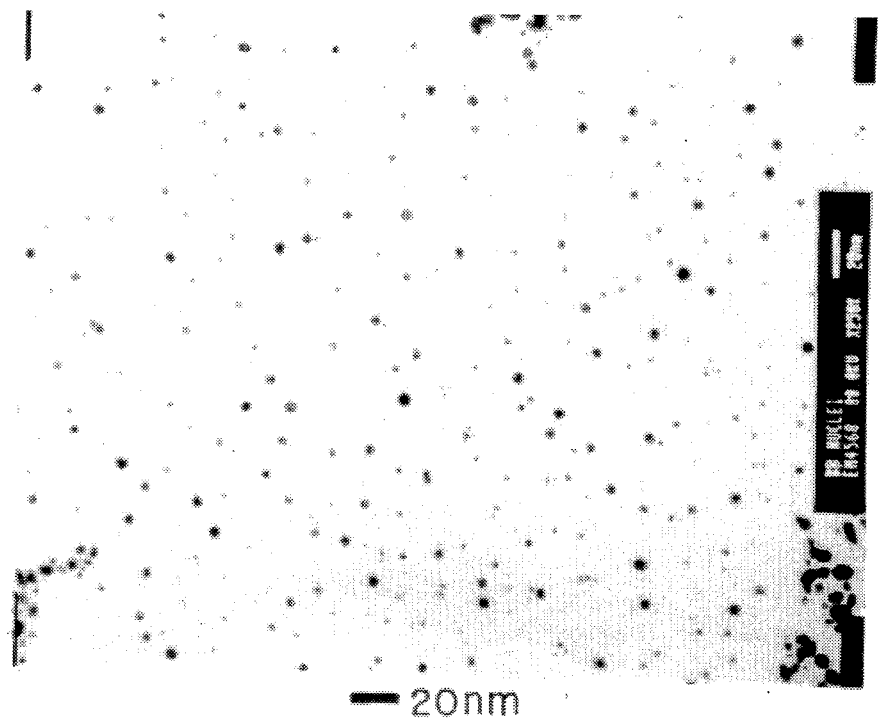
FIGS. 11, 12 and 13 are TEM images of the colloidal particles prepared in accordance with example 1.
Figure 12:
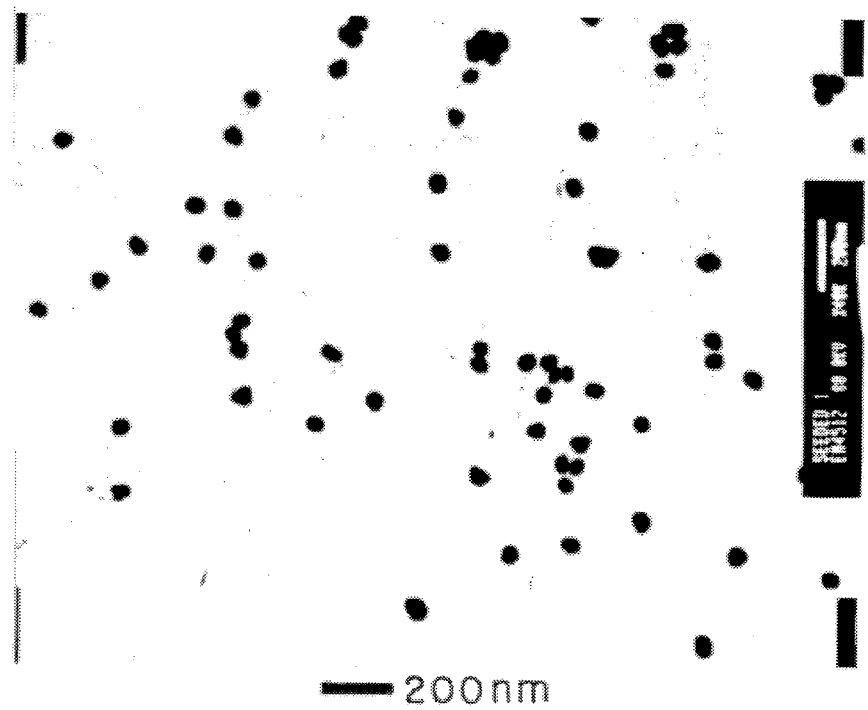
Figure 13:
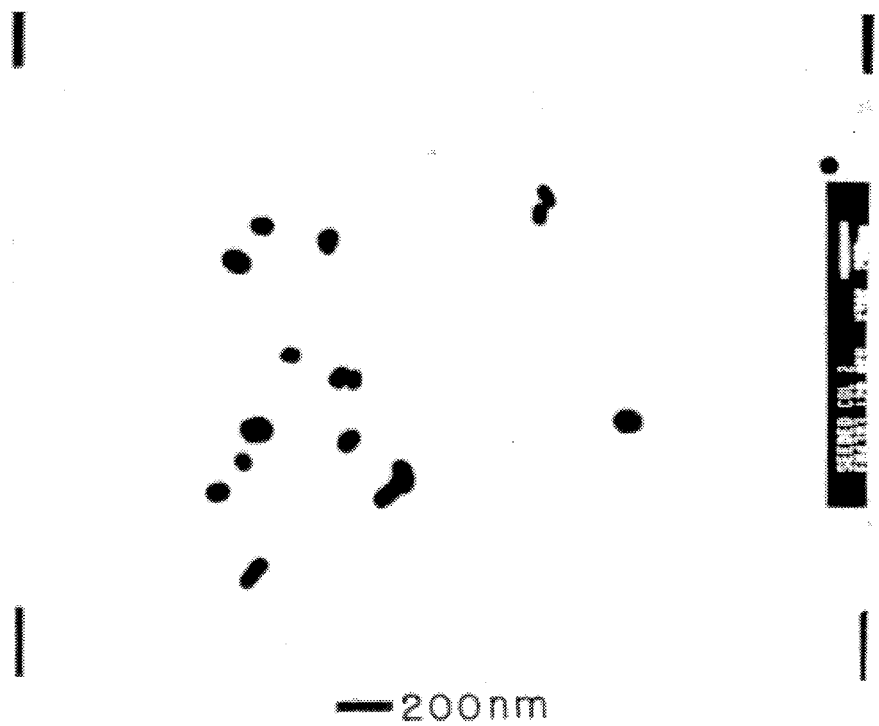
Figure 14:
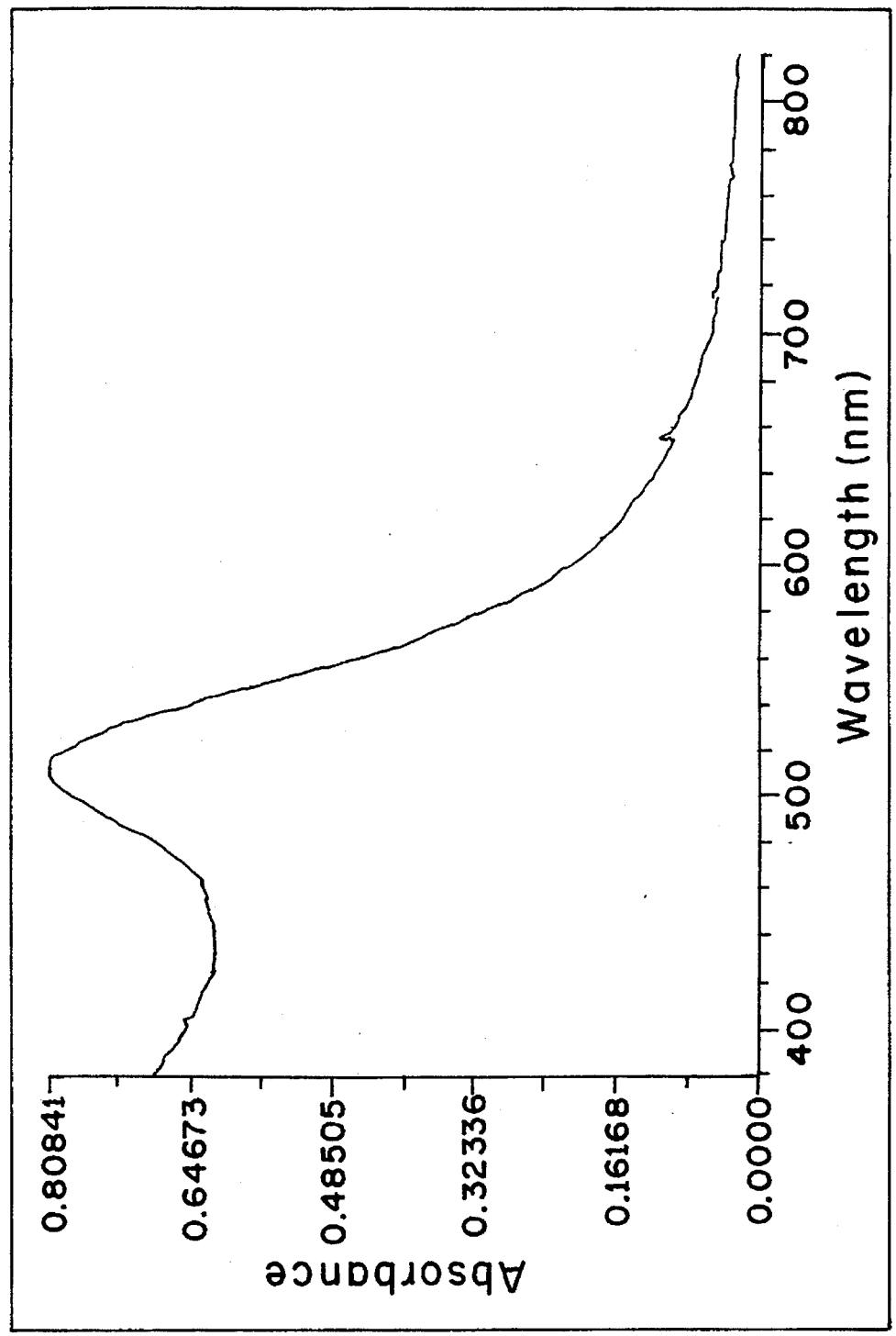
FIG. 14 is the solution optical spectrum of the seed nuclei of example 1.
Figure 15:
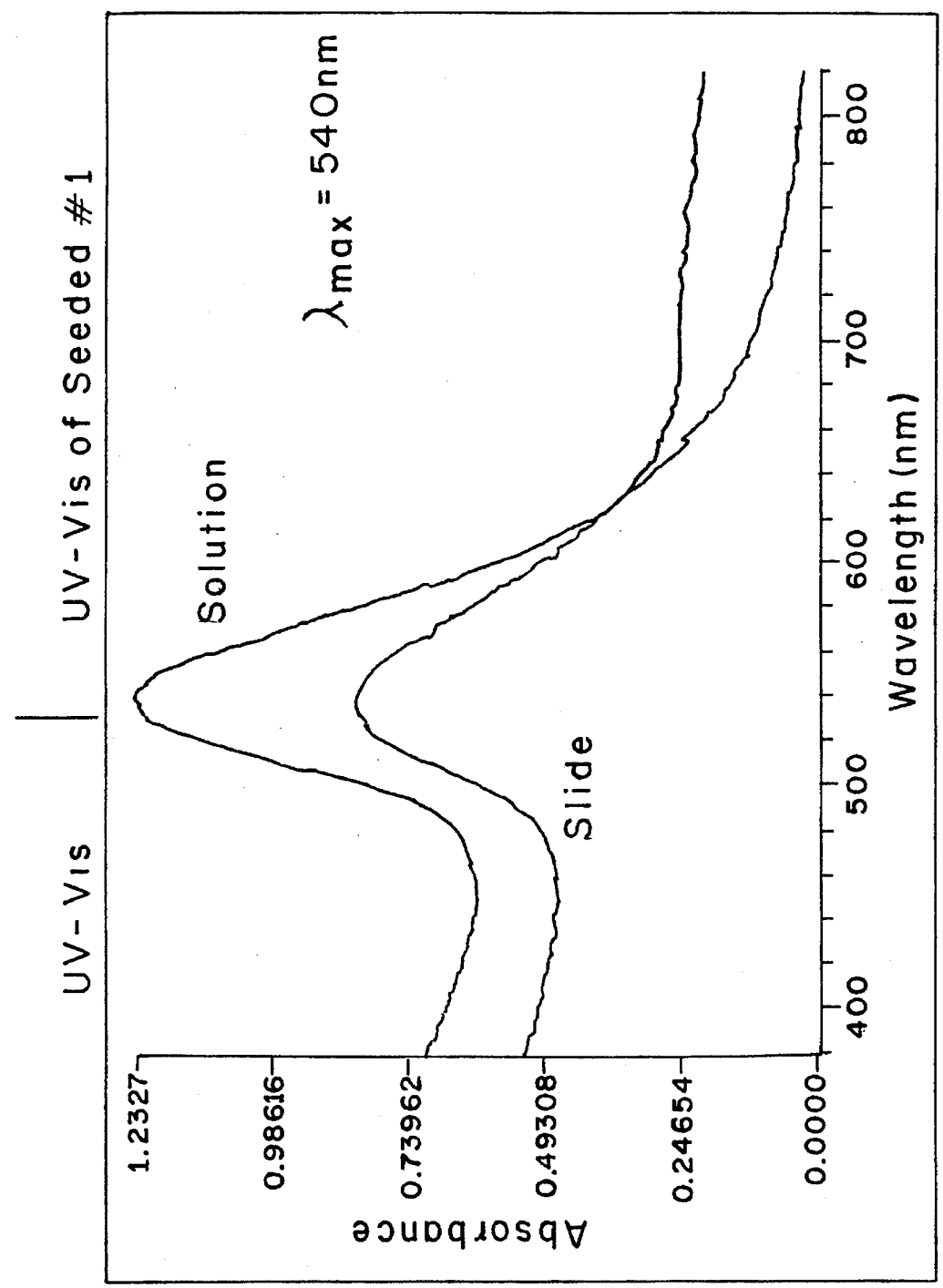
FIGS. 15 and 16 are uv-vis spectra of the larger particles derivatized on glass substrates and of the larger particles in solution as described in example 1.
Figure 16:
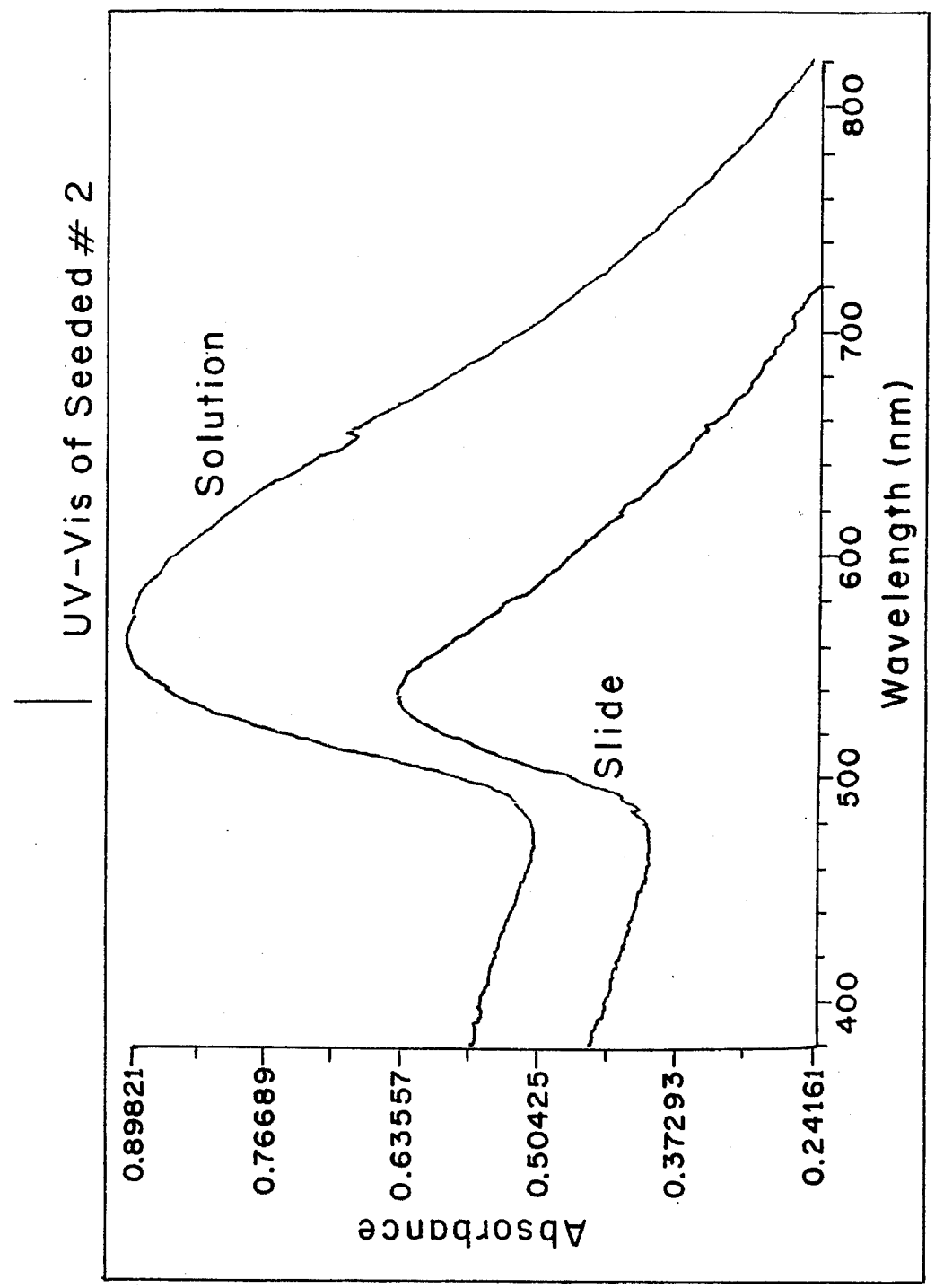

FIGS. 11–13 are TEM images of the particles. FIGS. 14 is the solution optical spectrum of the seed nuclei. FIGS. 15–16 are the uv-vis spectra of the larger particles derivatized on glass substrates and of the larger particles in solution.

EXAMPLE 2

Preparation of 2-layer colloid surfaces.

Once a colloid monolayer is formed, it is possible to produce a multi-layered material by introducing a chemical linking agent and a second layer of particle. Possible linkers include 4,4'-bis-pyridylethylene, 4,4'bipyridyl, p-xylenedithiol, and mecaptoethylamine. Experimental protocol for preparation of a typical surface follows.

Figure 17:
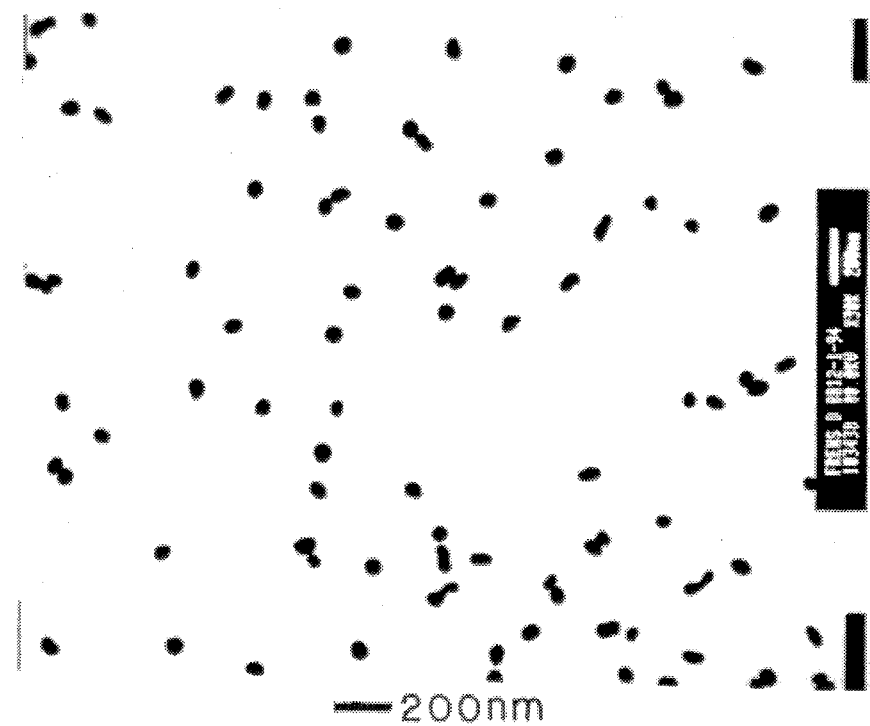
FIG. 17 shows a TEM image of the colloidal surface in example 2 after the first layer of colloidal particles has been applied.
Figure 18:
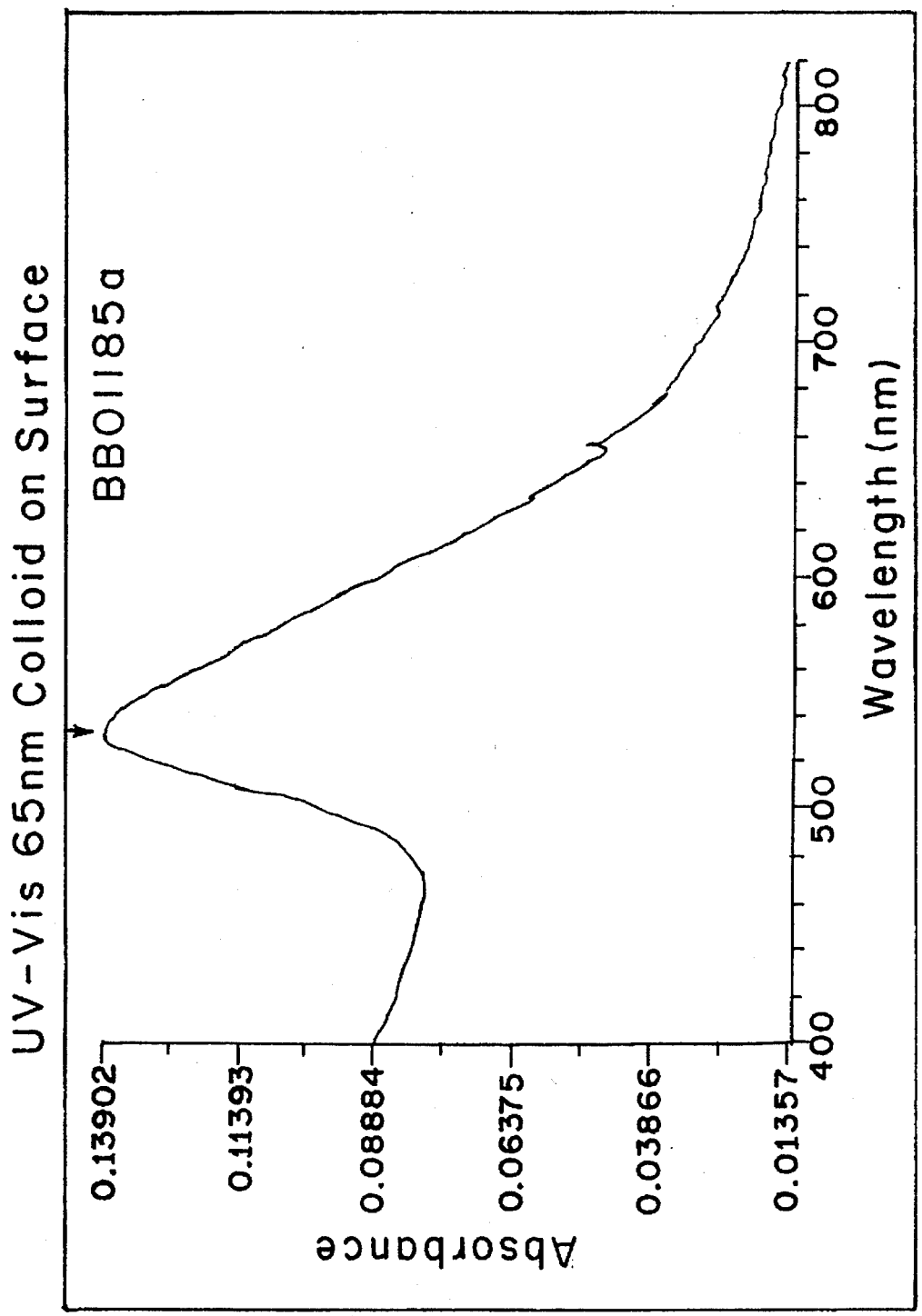
FIG. 18 shows an optical spectrum of the colloid surface in example 2 after the first layer of colloidal particles has been applied.
Figure 19:
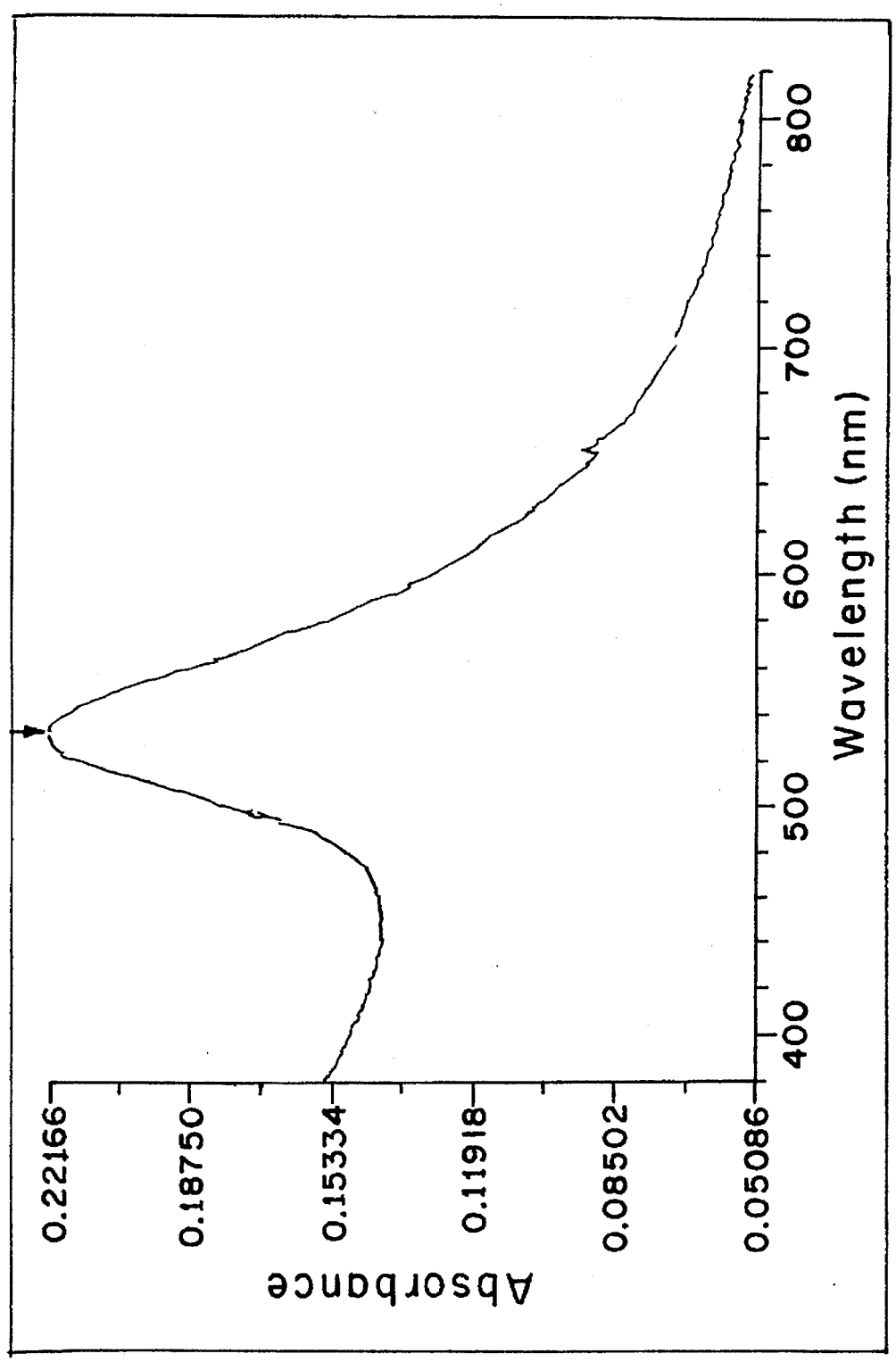
FIG. 19 shows an optical spectrum of the colloid surface in example 2 after the second layer of colloidal particles has been applied.

Glass slide surfaces, approximately 2 $cm^2$, were washed first in a solution of $HCl:HNO_3$ (3:1) followed by an $H_2O$ rinse and cleaning in a mixture of 30% $H_2O_2:H_2SO_4$ (1:4). The cleaned slides were placed in about 3 mL of a 1:10 solution of aminopropyltrimethylsiloxane (APTMS) in methanol for 1 hour. The slides were rinsed with water and placed in about 3 mL of a 7.0 $10^{-12}$M colloid solution overnight. These particles had the following shape: 65.8 nm major axis, and 49.3 nm minor axis. The slides were again rinsed with water, and stored in water. A TEM image of the particles is shown in FIG. 17. The resulting optical spectrum is shown in FIG. 18. This surface was immersed for 5 minutes in 1 mM mercaptoethylamine in water and rinsed. This surface was then immersed in a 17 nM solution of 12 nm colloidal Au particles for 15 minutes. FIG. 19 is the resulting optical spectrum.

EXAMPLE 3

Protein Coated Au Colloid monolayers

Quartz surfaces which had been cleaned in a mixture of $H_2SO_4:H_2O_2$ (4:1) were derivatized in neat silane solution for 2 days. After rinsing these surfaces in spectrophotometric grade $CH_3OH$, they were placed in a solution of 3-(N-maleimidopropionyl)-biocytin (0.31 mg/ml in 0.05M Tris buffer containing 0.1% BSA) for 18 h. Slides were rinsed in $H_2O$ and placed in solutions of the Au probe described below. The protein-Au probes had been aged for 1 hour prior to coating the slides; slides remained in solution overnight and were removed when the colloidal particles sedimented. Little to no coating was achieved in the first 5 h of exposure to the Au probes; optical spectra taken after the colloid sedimented indicated Au coating on all of the silane/b surfaces employed, with $1_{max}=550$ nm.

Protein-coated Au probes were prepared as follows: To 25 ml of a citrate-prepared Au colloid (12 nm diameter, 17 nM) was added 0.725 ml of streptavidin (0.34 mg/ml in triply distilled $H_2O$) and 0.241 ml of BSA (7.24 mg/ml in triply distilled $H_2O$). Within 4 hours, this solution showed some aggregation/sedimentation of particles, but particles were easily resuspended with shaking the solution. However, within 24 h, the particles had sedimented completely and could not be resuspended.

Quartz surfaces which had been cleaned in a mixture of $H_2SO_4:H_2O_2$ (4:1) were derivatized in neat silane solution for 2 days. After rinsing these surfaces in spectrophotometric grade $CH_3OH$, they were placed in a solution of 3-(N-maleimidopropionyl)-biocytin (0.31 mg/ml in 0.05M Tris buffer containing 0.1% BSA) for 18 h. Exposure of this surface to a streptavidin-coated Au colloid resulted in surface formation.

Figure 20:
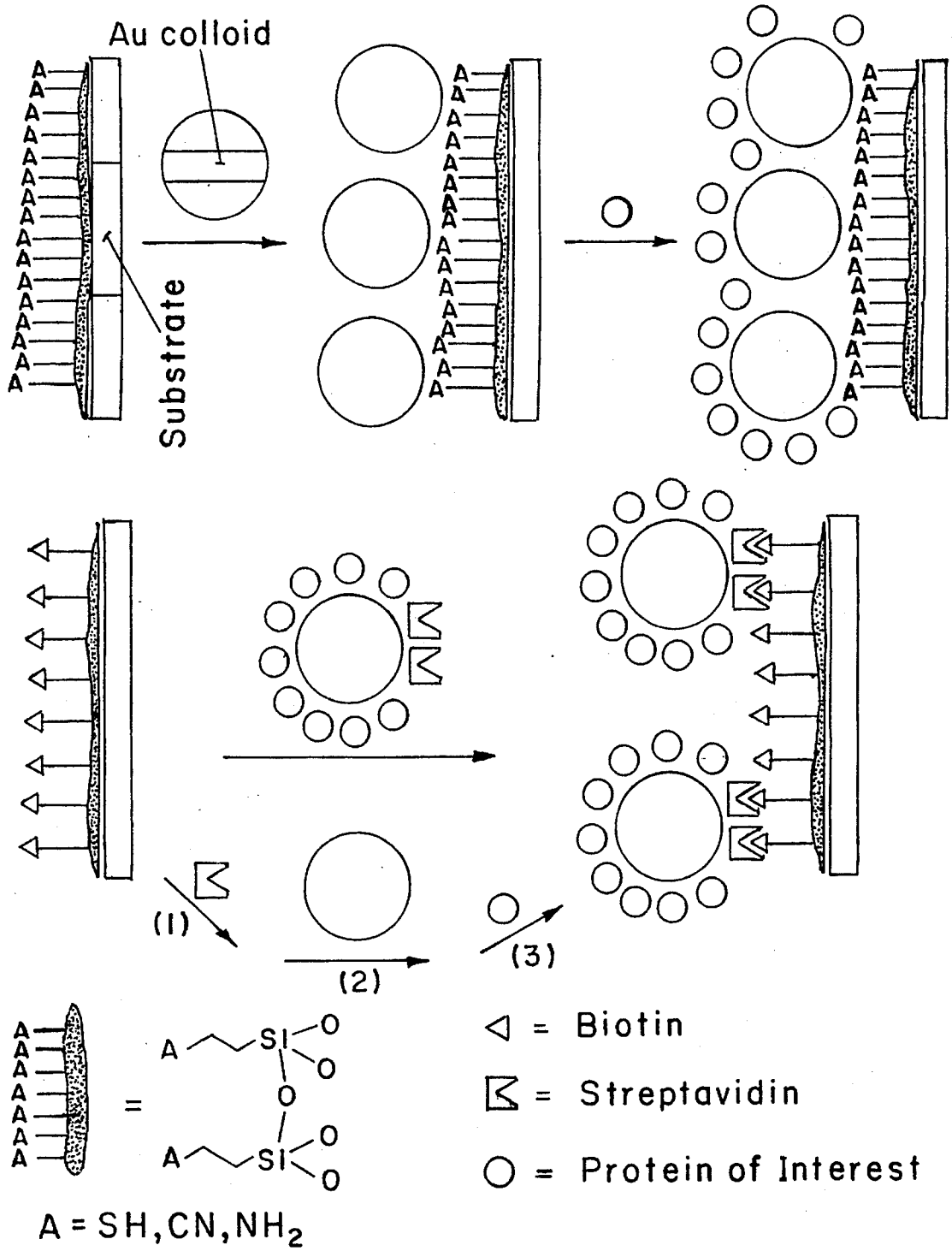
FIG. 20 shows non-covalent colloidal approaches to protein coated metal surfaces.
Figure 21:
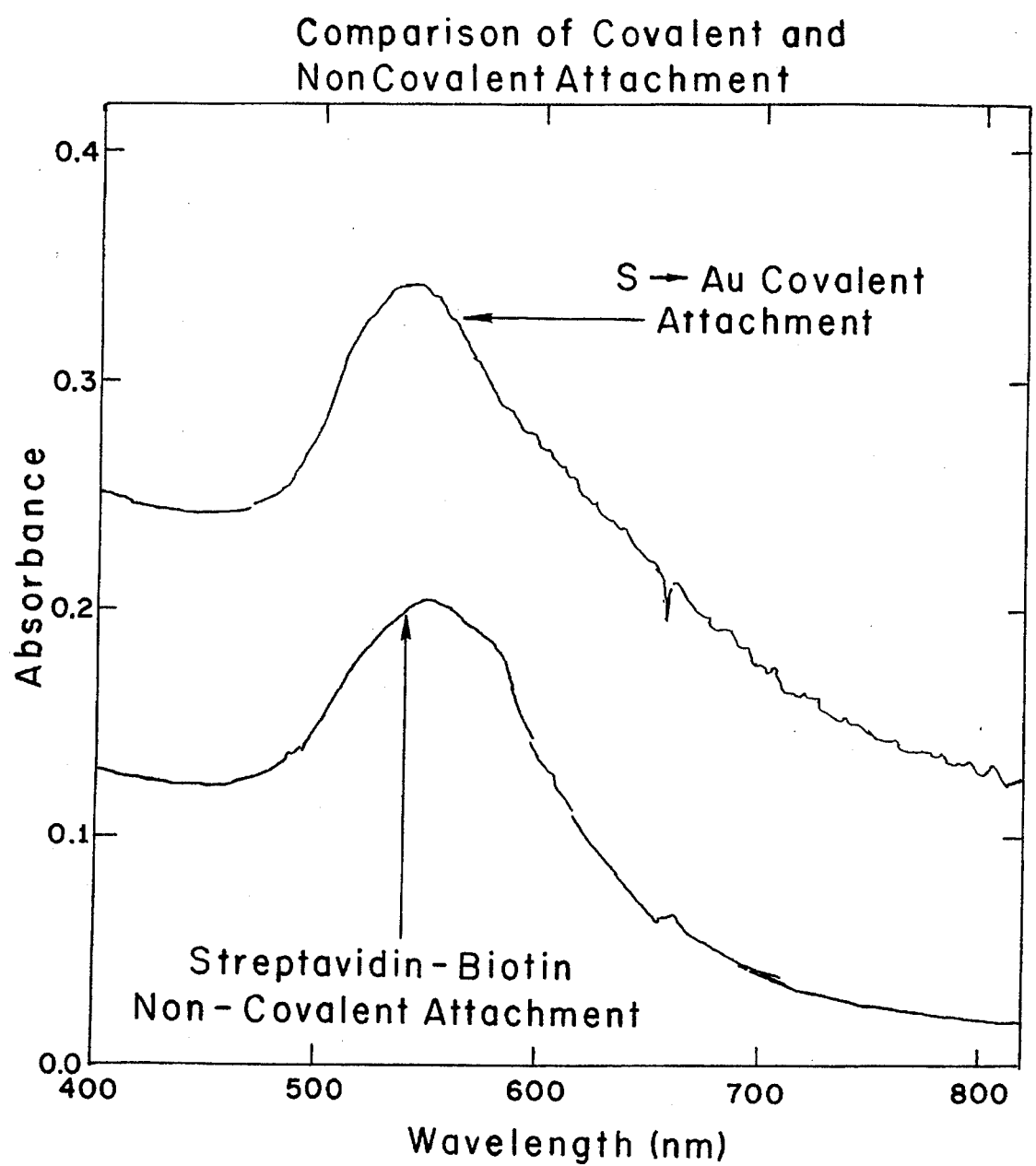
FIG. 21 is a comparison of the optical properties of covalent and non-covalent attachment.

FIG. 20 shows the strategies available for non-covalent attachment of colloids to surfaces, and how these strategies can be utilized to bind biomolecules to metals in a biocompatible fashion. FIG. 21 compares the coverages by covalent and non-covalent methods.

EXAMPLE 4

Detailed experimental protocols for the production of Ag-coated Au colloid monolayers by chemical or electrochemial reduction.

Materials

The following materials were obtained form Aldrich: $HAuCl_4 \cdot 3H_2O$, $Na_2SO_4$, trisodium citrate dihydrate, pyridine, and N,N- dimethyl-4-nitrosoaniline (p-NDMA). The following organosilanes were obtained from Hüls America, Inc.: 2-(diphenylphosphino)-ethyltriethoxysilane (DPPETES), 3-aminopropyltrimethoxysilane (APTMS), mercaptopropylmethyldimethoxysilane (MPMDMS) and 2-(trimethoxysilyl)ethyl-2-pyridine (PETMS). KCl, HCl, and $HNO_3$ were obtained from J. T. Baker. $Ru(NH_3)_6Cl_3$ was obtained from Johnson Matthey. Li Silver was obtained from Nanoprobes, Inc. Methanol (spectrophotometric grade) was obtained from EM Sciences. All chemicals were used as received. All $H_2O$ was 18 M__, distilled through a Barnstead Nanopure water purification system. Single component Ag epoxy was obtained from Epoxy Technologies, Inc and white expoxy was epoxi-patch from The Dexter Corporation. Glass microscope slides were obtained from Fisher Scientific, quartz slides from Technical Glass Products, and In-doped $SnO_2$ from PPG Industries, Inc.

Colloid Prepartion

Colloidal Au particles of 18 nm±1 nm and 12 nm were prepared as described previously*. The sols were characterized by optical spectroscopy.

Surface Derivitization

Glass and quartz microscope slides were cut to 25 mm×9 mm prior to cleaning in a bath of 4 parts $H_2SO_4$ to 1 part 30% $H_2O_2$ at 60° C. After rinsing in $H_2O_1$ slides were cleaned in a bath of 3:1 $HCl:HNO_3$. Slides were rinsed in $H_2O$ and stored in $CH_3OH$ until needed. Clean surfaces were placed in 2% (by volume) 2(diphenylphosphino)ethyltriethoxysilane or 2-pyridylethyltdethoxysilane in $CH_3OH$. Solutions were shaken vigorously and reacted for 24 hours. Substrates were then removed from solution and rinsed thoroughly in $CH_3OH$, then rinsed and stored in water. Silanized surfaces were immersed colloidal Au for 24 hours. Surfaces were then removed, rinsed several times in $H_2O$ and stored in $H_2$. In-doped $SnO_2$ was cut to an approximate area of 3.0 $cm^2$. Copper wire was adhered to the $SnO_2$ with Ag epoxy. The copper wire was encased in glass tubing and sealed with white Epoxy-Patch The contact area was covered with a white epoxy. The electrodes were sonicated in neat reagent grade acetone, soap solution, and $H_2O$ for approximately 15 minutes each, then were soaked in approximately 3M NaOH for over 2 hours. Clean electrodes were placed in aqueous APTMS (1% by wt.) for 5 minutes. Silanized electrodes were then rinsed with $H_2O$ and dried for 48 hours. The electrodes were placed in the Au colloid solution for 2 hours. Colloid-coated electrodes were then rinsed and stored in $H_2O$. The other $SnO_2$ samples were placed in neat MPMDMS for approximately 5 hours. The substrate was rinsed with $CH_3OH$ and air dried. The polymer-coated substrate was then placed into fresh Au colloid for at least 8 hours for high coverage $SnO_2$. The Au colloid-coated substrate was removed, rinsed with triply-distilled $H_2O$, and air dried.

Electrode Characterization

A 5 mM $Ru(NH_2)_6Cl_3$ in 0.1M $Na_2SO_4$ was de with $N_2$ for over 15 minutes prior to analysis. An SCE was used as a reference electrode and Pt gauze was used as the counter electrode in all measurements.

Sample Preparation

Li Silver Reduction

Ag was reduced onto the colloid-coated slides by immersing the substrates in a solution of equal volumes of LI Silver enhancer and initiator solutions. Reaction time was varied between 5 and 30 minutes. Surfaces were then rinsed and stored in $H_2O$.

Ag Deposition

An electrolyte solution of 1 mM $Ag_2SO_4$ and 0.1M $Na_2SO_4$ was degassed with $N_2$ for at least 15 minutes prior to the electrochemical deposition. A Pt gauze electrode was used as a counter electrode. A cyclic voltammogram was first done with the electrode scanning from 1.0 V to 0.0 V vs SCE at 50 mV/sec. A constant potential was applied to the electrode until a predetermined number of Coulombs had been counted. The cyclic voltammogram and the reduction of Ag were both done in the same solution under a blanket of $N_2$. The electrodes were then removed, UV-Vis spectra were collected, and the electrodes were stored in $H_2O$.

Surface Characterization

SERS of 0.5M pyridine/0.1M KCl solution on the electrodes were performed. The potentials were obtained with a Pt counter electrode and a SCE reference electrode and were varied from 0.0 V to –0.9 V. SERS of the Li Silver was done on 0.5 mM p-NDMA in $CH_3OH$. Experiments were performed with 632.8 nm excitation, 7.5 $cm^{-1}$ bandpass, 0.5 $cm^{-1}$ steps and 1 second integration.

Instrumentation

SERS spectra were obtained with a Spectra-Physics Model 127 HeNe ion laser operated at 632.8 nm. Raman spectra were acquired with a Spex Model 1403 scanning double monochromatic with a pair of 1800 groove/mm gratings and thermoelectrically-cooled Hamamatsu photomultiplier tube housed in a Products for Research casing. Monochromator entrance and exit slits were set for a spectral bandpass of 7.5 $cm^{-1}$. Spectral acquisition and grating movement were controlled via the DM3000 software provided by Spex. Plasma lines were filtered out of the incident beam through a band pass filter (Ealing ElectroOptics.) Incident light was focused at an angle ~<30° to the surface normal. Scattered radiation was collected and collimated with a Minolta 50 mm camera lens (f/#1.2) and focused through a polarization scrambler (Spex) onto the entrance slits of the monochromator. Substrates were supported by Teflon block (⅓ of sample height) in a quartz cuvette. The cuvette holder rested on a home-built stage adjustable in all three dimensions.

Optical spectra were obtained using a Hewlett-Packard 8452A diode array spectrophotometer with a 2 nm spectral resolution and 1 s integration time. Samples were supported in the cuvettes by use of the teflon block described above.

The cyclic voltammograms of the Ru(NH$_3$)$_6$Cl$_3$ were done on a Cypress Systems CS87 potentiostat. The cyclic voltammograms and the Ag deposition were carded out using an EG&G PAR. 173/175 combination programmer/potentiostat, and recorded by a NGI Servogot 790 XY recorder. Ag deposition was monitored using a Linseis L6512B strip chart recorder. The potential during the Raman scans was held constant by a BAS CV27 potentiostat.

Atomic Force Microscopy (AFM) was performed on a Digital Instruments Nanoscope III Multimode AFM in tapping mode. The samples were cut to approximately 1 cm X 1 cm and allowed to air dry. The scan size was 1.00 µm, and scan rate was 0.9988 Hz. X and Y axes are 1 µm with 0.2 µm divisions, and all the z-axis are 300 nm.

Figure 22:
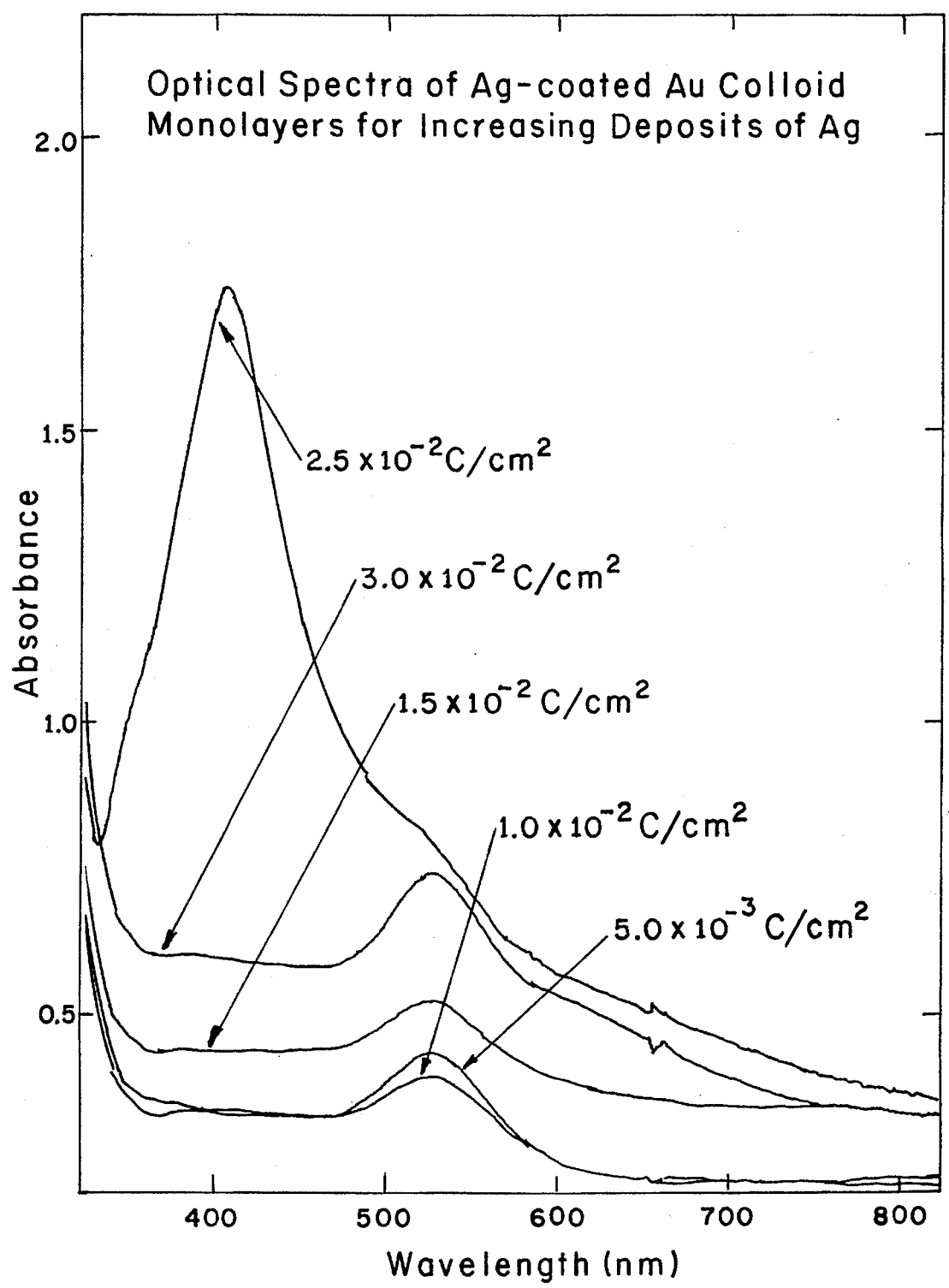
FIG. 22 shows the changes in optical spectra upon electrochemical reduction of Ag ions onto Au colloid monolayers in accordance with example 4.
Figure 23:
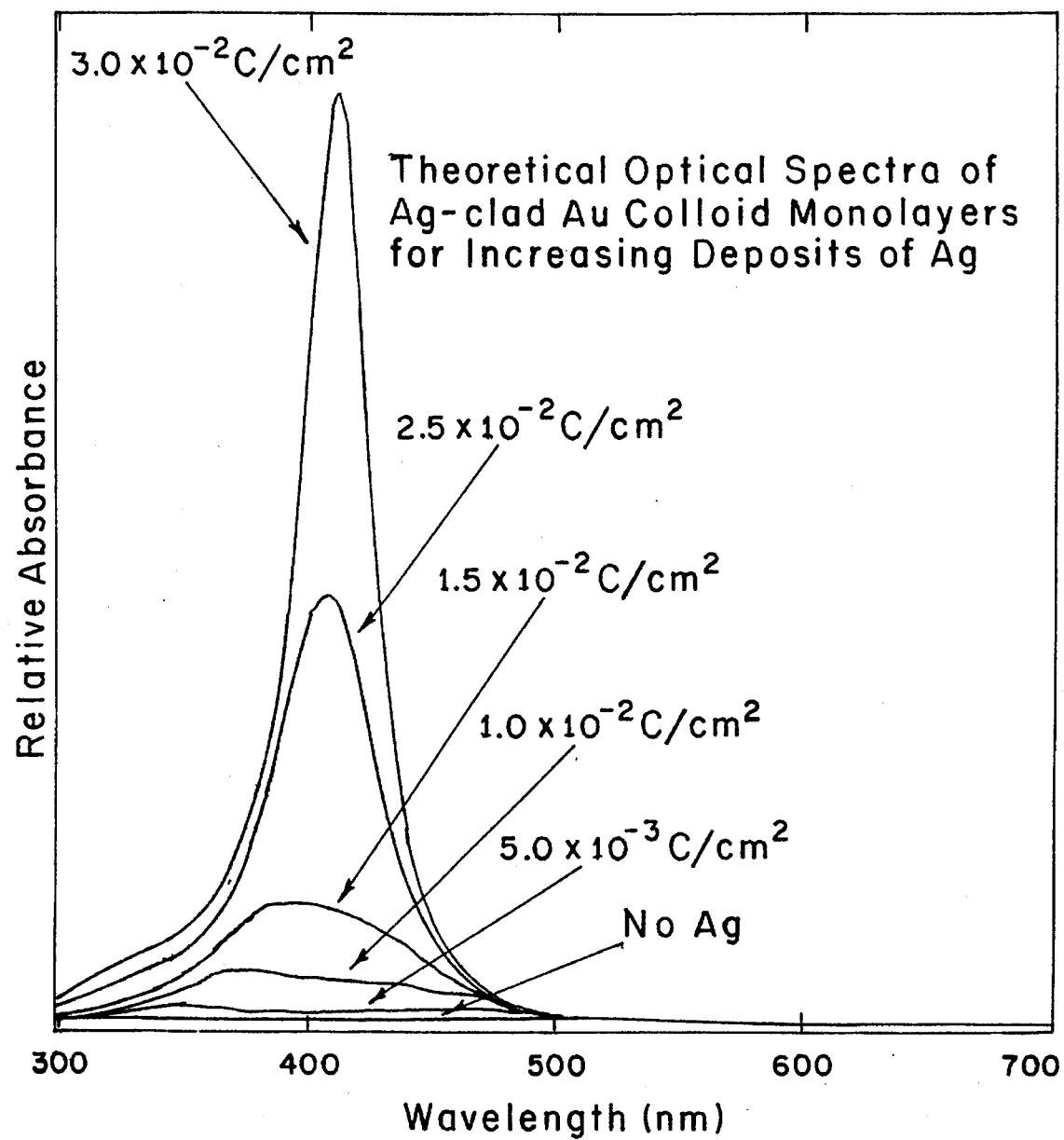
FIG. 23 shows theoretical modeling of the expected change in optical spectra of Ag-clad Au colloid monolayers for increasing deposits of Ag.
Figure 24A:
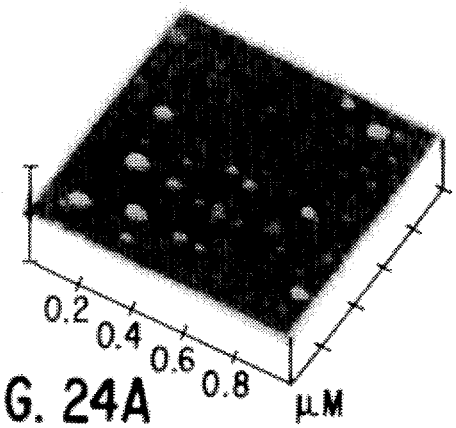
FIG. 24 shows AFM characterization of these surfaces described in example 4.
Figure 24B:
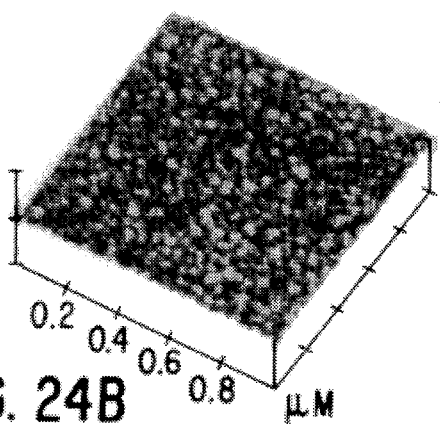
Figure 24D:
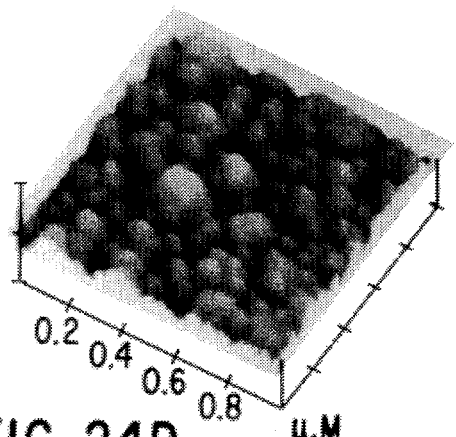
Figure 24C:
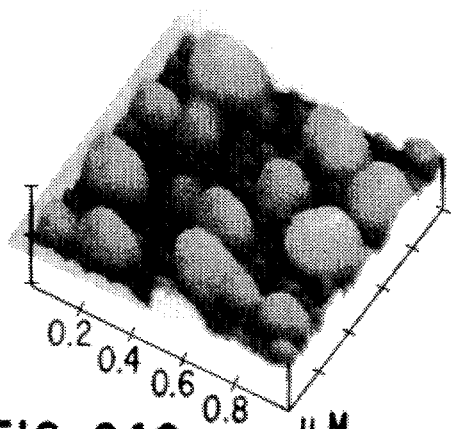
Figure 24E:
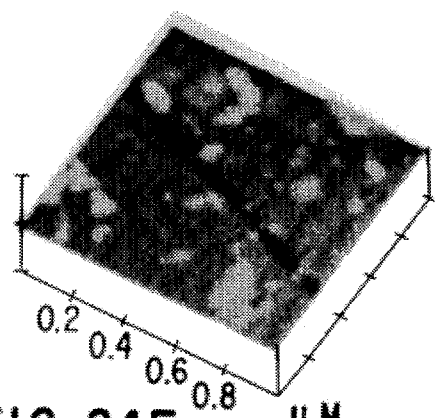
Figure 25:
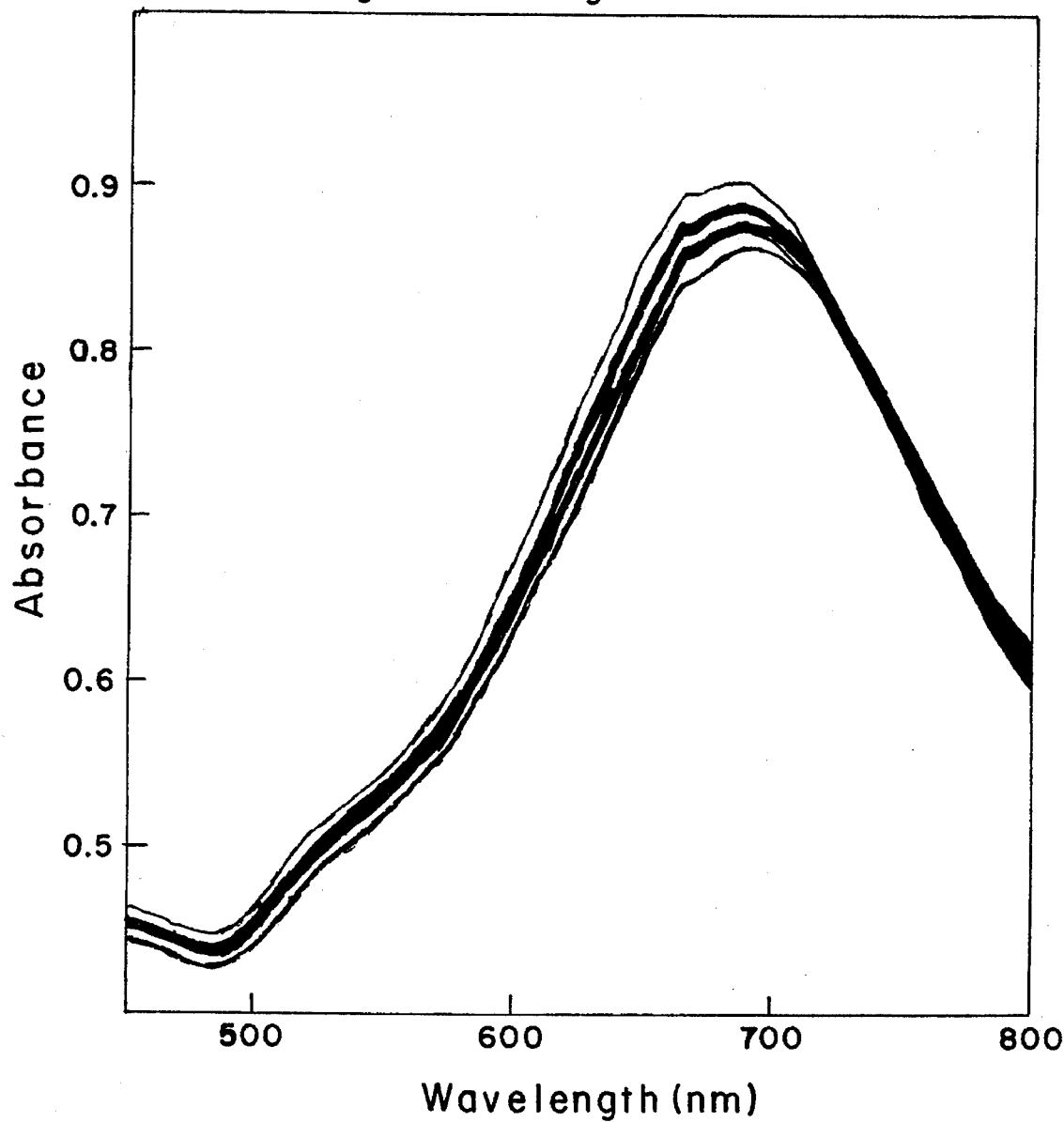
FIG. 25 shows optical spectra as a function of electrochemical potential (E) for a surface with high Au coverage.
Figure 26:
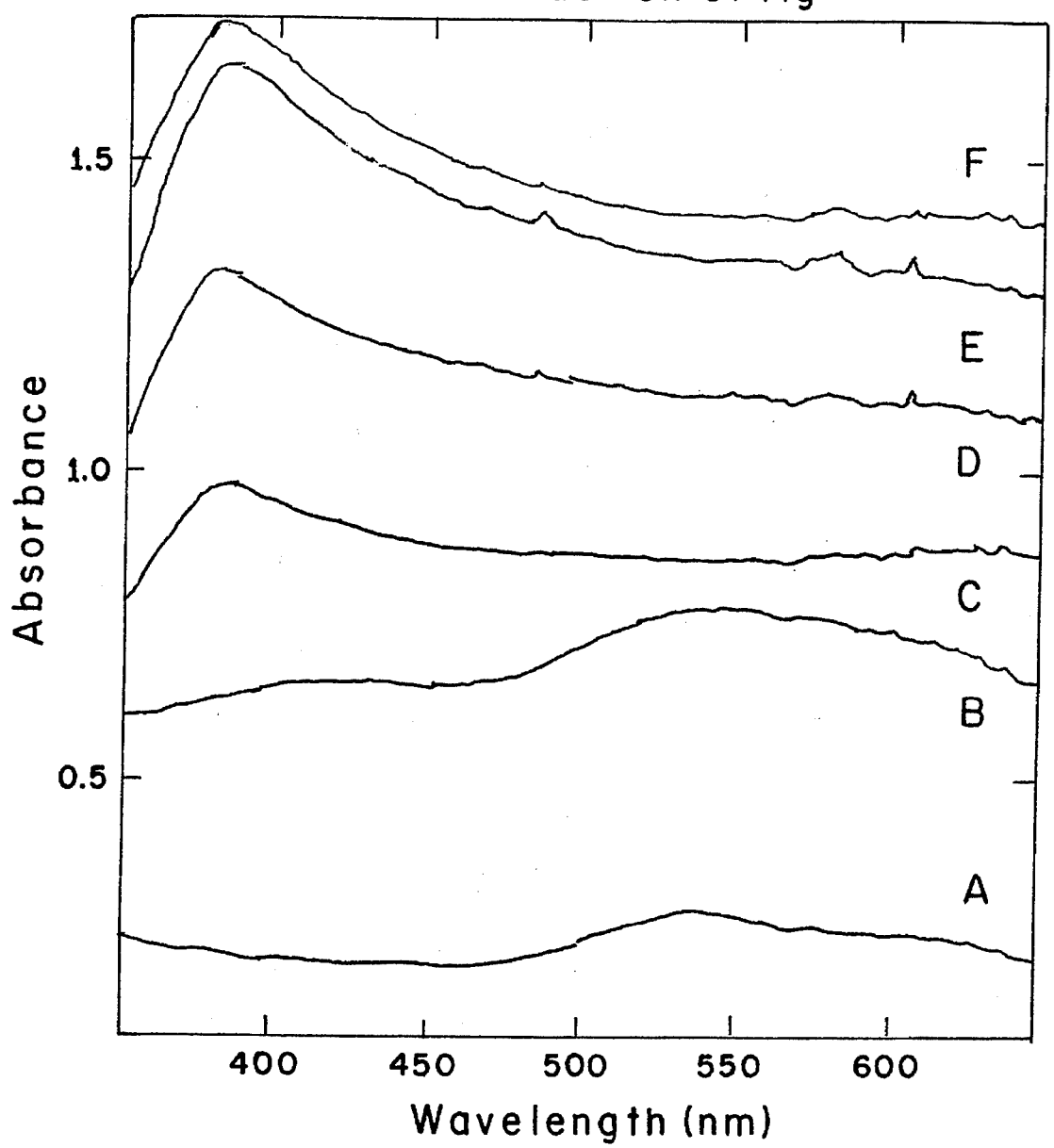
FIG. 26 shows the changes in optical properties accompanying chemical deposition of Ag onto preformed Au colloid monolayers.

FIG. 22 show the changes in optical spectra upon electrochemical reduction of Ag ions onto Au colloid monolayers. FIG. 23 shows theoretical modeling of the expected changes, showing that the Ag is selectively deposited on the Ag surface. FIG. 24 shows AFM characterization of these surfaces. FIG. 25 shows optical spectra as a function of electrochemical potential (E) for a surface with high Au coverage (from 0 to −1 V vs. SCE) ,showing that these surfaces are stable under electrochemical conditions. FIG. 26 shows the changes in optical properties accompanying chemical deposition of Ag onto preformed Au colloid monolayers.

EXAMPLE 5

Figure 27:
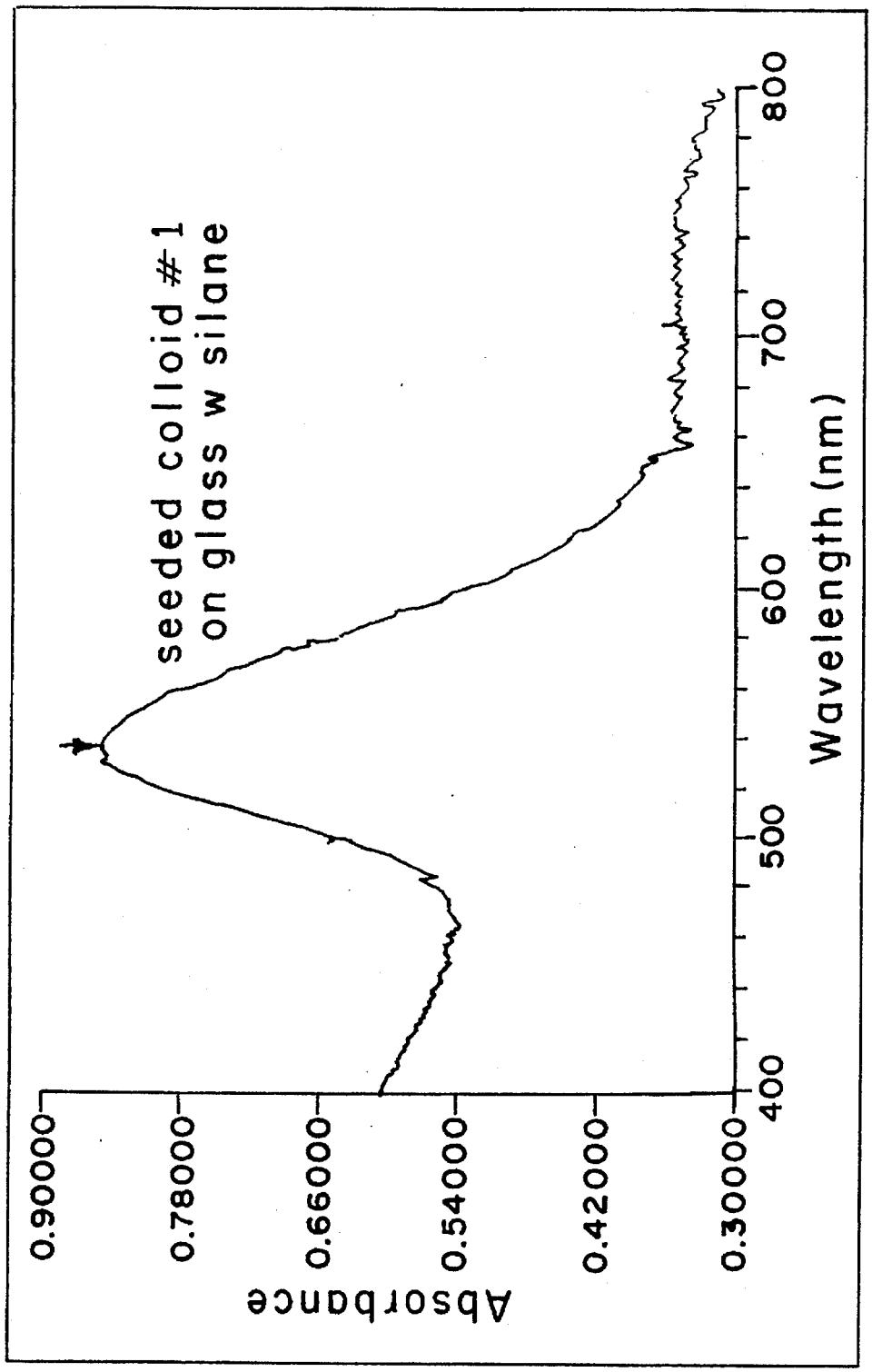
FIG. 27 shows the uv-vis optical properties of a surface coated with colloidal metal particles that were stabilized with PEG.

Large colloids can be stabilized by addition of polyelthyleneglycol (PEG). This does not preclude derivatization on surfaces. For example, colloidal solutions were stabilized by the addition of fresh 1% PEG (mw 20,000 Fluka) until the final PEG concentration was 0.1%. The colloidal solution was then centrifuged in glass test tubes at 3000×G for 15 Minutes to pellet the colloid. The supernatant was removed and the colloid was resuspended in distilled H$_2$O. This resuspended colloid was then adsorbed on to silanized surfaces as described elsewhere. The resulting surface was characterized by uv-vis in FIG. 27.

EXAMPLE 6

Preparation of 2.5 nm Au particles on thin layers of inorganic oxides coated with organic polymers.

Figure 28:
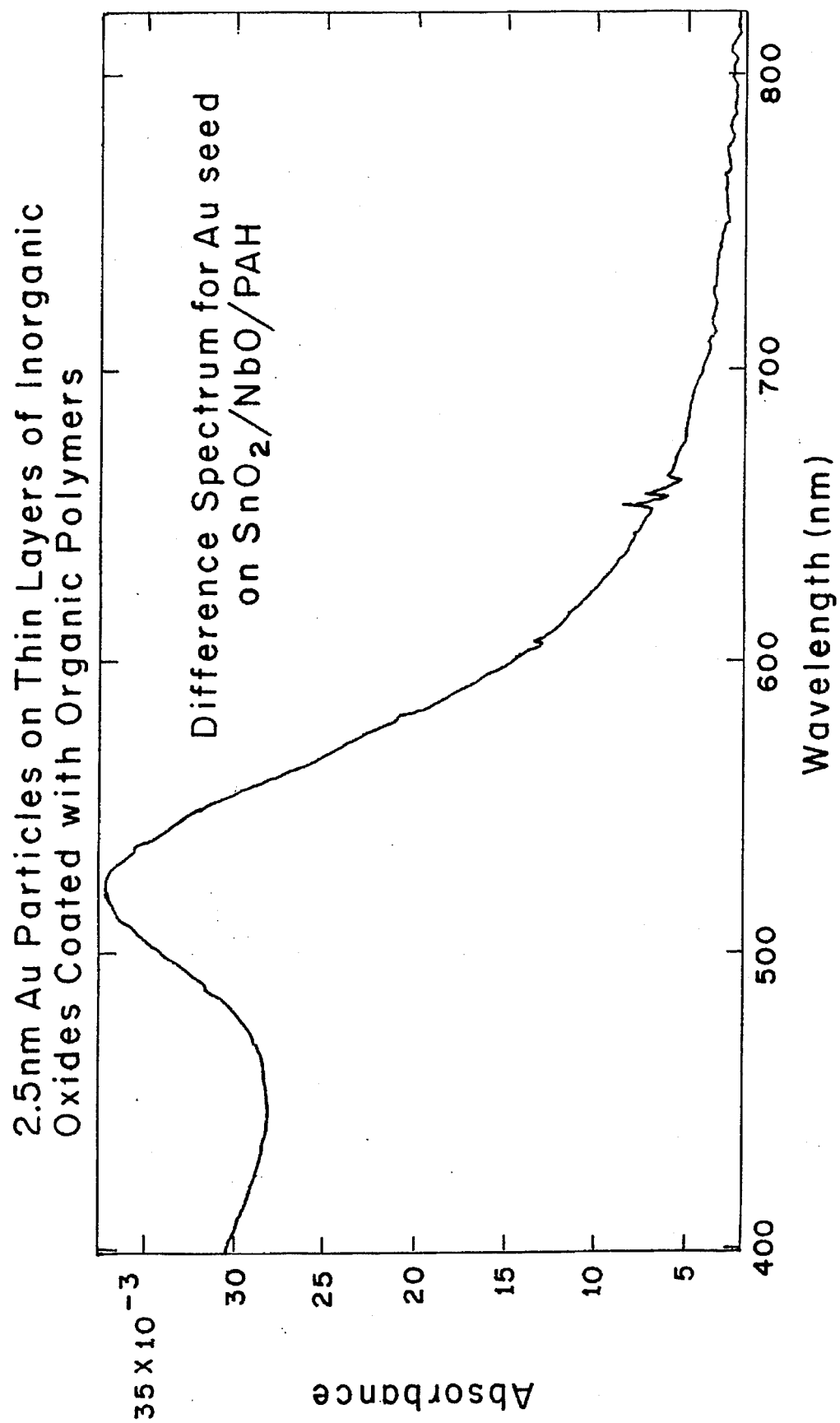
FIG. 28 shows the optical spectrum of a substrate coated with poly(allylamine) hydrochloride and immersed in a solution of colloidal Au.

Indium-doped SnO$_2$, cut to dimensions of 1 cm by 1 cm, was cleaned as follows: surfaces were sonicated for 15 min each in soapy water, 3 changes of triply distilled H$_2$O, and acetone. After the surfaces were rinsed in H$_2$O, they were soaked in 3M NaOH for 1.5 h. Substrates were stored in H$_2$O until needed for further derivatization. The SnO$_2$ was derivatized with alternating layers of K$_2$Nb$_6$O$_{17}$ and poly-(allylamine) hydrochloride (PAH) as described elsewhere [Keller et al, JAGS, 116, 8817]. PAH-coated surfaces were immersed in a solution of colloidal Au (x nm±y nm) for 28 h. Substrates were then rinsed and stored in H$_2$O. The optical spectrum in FIG. 28 shows the presence of Au particles on the surface.

EXAMPLE 7

Preparation of a 12 nm Au Colloid monolayer on SnO$_2$ Electrode Preparation

Pyrolytically deposited Sb doped SnO$_2$ (R=100 ohm cm$^2$) on glass 3 mm thick was purchased from Delta Technology Lmtd. The SnO$_2$ on glass was cut into pieces of the size 2 cm$^2$, piranah washed and sonicated in triply distilled H$_2$O for 15 min. Contact to the SnO$_2$ was made with Ag epoxy. Cu wire encased in 3 mm glass tubing was used as the lead. The Ag epoxy was covered with white epoxi patch (Dexter Corporation). Electrodes were sonicated in triply distilled H$_2$O for 15 min. prior to use.

Figure 29:
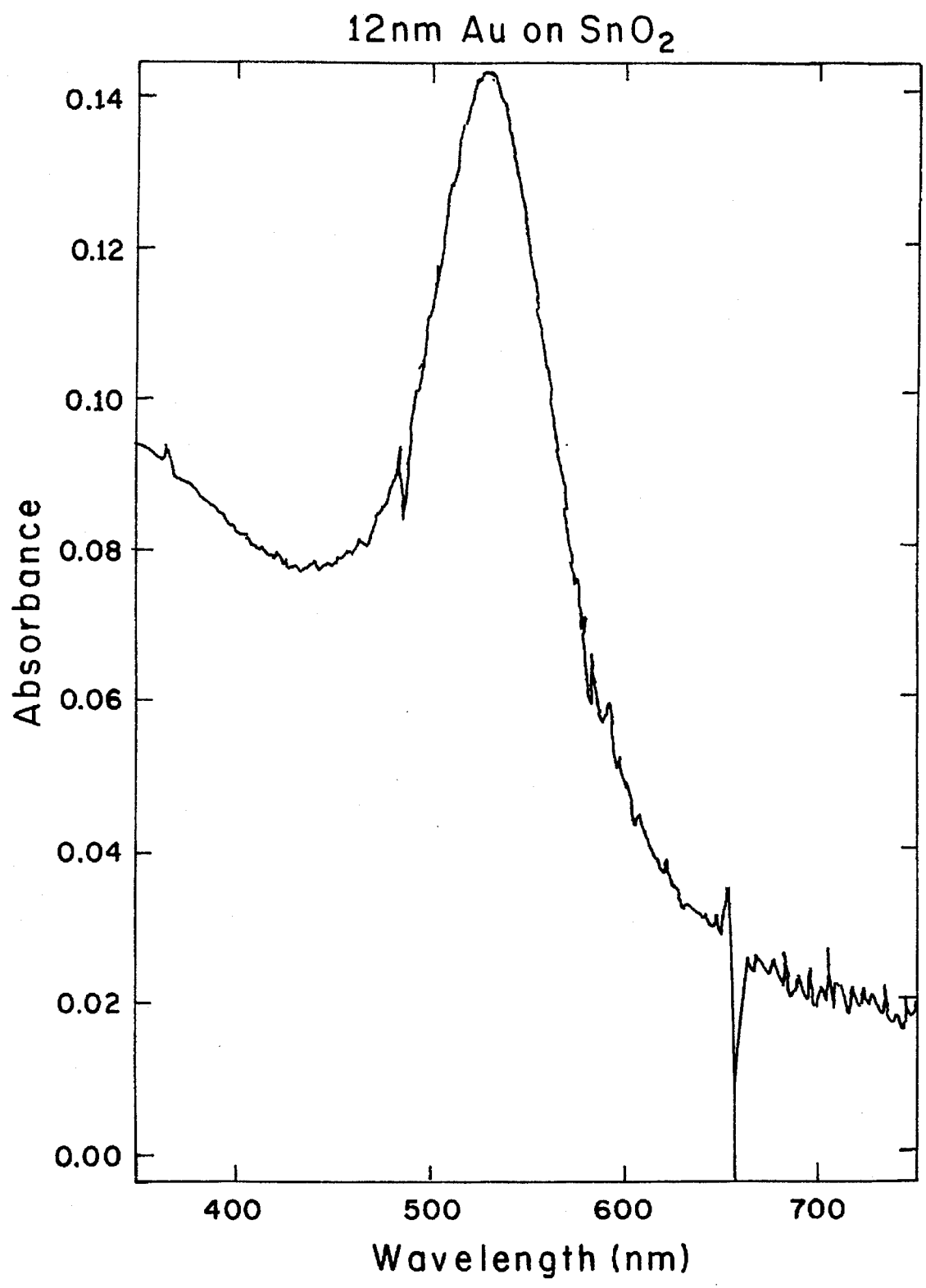
FIG. 29 shows the optical spectrum of a colloid monolayer on $SnO_2$ electrode.

The clean electrodes were placed in 3M NaOH for five hours, rinsed in H$_2$O, placed in 1% (by weight) aqueous APMDES for 10–15 minutes, and then rinsed with H$_2$O. The electrodes were allowed to dry at room temperature for 2 days. The electrodes were placed in a solution of Au colloid for 3 hours, 20 min., rinsed with H$_2$O, and stored in H$_2$O. An optical spectrum is shown in FIG. 29.

The Au and Ag colloid-based surfaces have many of the best attributes of previously described SERS substrates (uniform particle size, electrochemical addressability, and large enhancement factors), and a combination of other features few surfaces can match (ease of characterization, no geometric constraints, low cost, and very high intra- and inter-sample reproducibility). When the substrate is optically transparent in the visible, uv-vis can be used to assess particle coverage and spacing. These substrates are strongly active for SERS using 647.1 nm excitation, as are those prepared on glass and quartz slides. These advantages, coupled with the ability to vary particle size, spacing, and the nature of the monolayer support suggest a rich use for these materials in fundamental and applied studies. For example, no theoretical model correlating SERS activity with particle size or spacing has ever been quantitatively tested; metal colloid monolayers should allow such experiments to be carried out. The flexibility and control available through this method are noteworthy. Particle size, particle-polymer interactions, and the physical and chemical properties of the underlying substrate can all be manipulated to control the nanoscale architecture produced. The solution-based assembly protocol makes substrate fabrication routine; it also removes virtually all constraints on substrate size/shape. Therefore, Au colloid monolayers can be prepared on substrates that allow facile characterization, including macroscopic glass/quartz slides and TEM grids. Most importantly, SERS can now be considered for applications in which preparation of multiple high-quality substrates was previously viewed as an insurmountable barrier.

Thus is described my invention and the manner and process of making and using it in such full, clear, concise, and exact terms so as to enable any person skilled in the art to which it pertains, or with which it is most nearly connected, to make and use the same.

What is claimed is:

1. A method for the preparation of metal colloid monolayers or submonolayers comprising the steps of:

a.) selecting a substrate b.) coating the substrate with a bifunctional organic film to impart to said substrate a functionality that allows for bonding of metal colloid particles; and c.) contacting the organic film coated substrate with a solution of colloid metal particles to bind said particles to the functional groups on said organic film thereby forming said monolayer or submonolayer, said method resulting in an organic film coated substrate containing a surface layer of colloidal metal particles that are closely spaced, predominately unaggregated and confined to nearly a single plane.

2. A method according to claim 1 wherein said substrate is selected from the group consisting of glass, quartz, alumina, tin oxides, and metals.

3. A method according to claim 1 wherein said functionality is imparted either by covalent or non-covalent bonding.

4. A method according to claim 3 wherein said metal particles are coated with a protein.

5. A method according to claim 4 wherein said substrate is coated with biotin and then contacted with a colloidal metal coated with a protein and streptavidin thereby forming a colloid based biocompatible surface held together by non-covalent interactions.

6. A method according to claim 1 wherein said metal colloid submonolayers are silver or gold.

7. A method according to claim 1 wherein the size of said metal particles lies within the range 3–100 nm.

8. A method according to claim 1 wherein said contacting of the organic film with a solution of colloid metal particles is done by immersing the coated substrate into a solution of colloidal metal particles causing the particles to bind to the functional groups of the organic film coated substrate.

9. A method according to claim 1 wherein said coating is an organosilane, poly(allylamine) hydrochloride or a biotin.

10. A method according to claim 9 wherein said coating step involves surface-initiated polymerization of a bifunctional alkoxysilane having the formula $(RO)_3Si(CH_2)_3A$, where the pendent functional group A has a high affinity toward metal surfaces.

11. A method for the preparation of metal colloid monolayers or submonolayers comprising the steps of:

a.) selecting a substrate selected from the group consisting of glass, quartz, alumina, tin oxides, and metals;

b.) coating said substrate with a bifunctional organic film selected from the group consisting of organosilanes, poly(allylamine) hydrochloride, and biotin to impart to said substrate a functionality that allows for bonding of metal colloid particles; and c.) immersing the organic film coated substrate in a solution of colloid metal particles to bind said particles to the functional groups on said organic film thereby forming said monolayer or submonolayer;

said method resulting in an organic film coated substrate containing a surface layer of colloidal metal particles that are closely spaced, predominately unaggregated and confined to nearly a single plane.

12. A method according to claim 11 wherein said colloid metal particles are selected from Au and Ag.

13. A method according to claim 11 wherein the size of said metal particles lies within the range 3–100 nm.

14. A method according to claim 11 wherein said metal particles are coated with a protein.

15. A method according to claim 14 wherein said substrate is coated with biotin and then contacted with a colloidal metal coated with a protein and streptavidin thereby forming a colloid based biocompatible surface held together by non-covalent interactions.

* * * * *